United States Patent [19]
Chan et al.

[11] Patent Number: 5,557,761
[45] Date of Patent: Sep. 17, 1996

[54] SYSTEM AND METHOD OF GENERATING OBJECT CODE USING AGGREGATE INSTRUCTION MOVEMENT

[75] Inventors: Sun C. Chan, Fremont; James C. Dehnert, Palo Alto; Raymond W. Lo, Sunnyvale; Ross A. Towle, San Francisco, all of Calif.

[73] Assignee: Silicon Graphics, Inc., Mountain View, Calif.

[21] Appl. No.: 186,248

[22] Filed: Jan. 25, 1994

[51] Int. Cl.$^6$ .................................................. G06F 9/45
[52] U.S. Cl. ..................... 395/375; 364/DIG. 1; 364/DIG. 2; 364/280; 364/280.4; 364/280.5; 364/973
[58] Field of Search .................... 364/Dig. 1, DIG. 2; 395/375

[56] References Cited

PUBLICATIONS

Ford, Jr., L. R. and D. R. Fulkerson, "Static Maximal Flow", *Flows in Networks*, Publisher: Princeton University Press, pp. 1–22, 1962.
Fisher, Joseph A., "Trace Scheduling: A Technical for Global Microcode Compaction", *IEEE Transactions on Computers*, vol. c–30, No. 7, pp. 478–490, Jul. 1981.
Charlesworth, Alan E., "An Approach to Scientific Array Processing: The Architectural Design of the AP–120B/FPS–164 Family", *Computer*, pp. 18–27, 1981.
Aho, Alfred V., Ravi Sethi and Jeffery D. Ullman, *Compilers: Principles, Techniques, and Tools*, Publisher: Addison--Wesley Publishing Company, pp. 10–23, 1986.
Ellis, John R., *Bulldog: A Compiler for VLIW Architectures*, Publisher: The Massachusettes Institute of Technology, 1986.
Nicolau, Alexandru, "A Fine–Grain Parallelizing Compiler", *Scheduling*, Computer Science Department, Cornell University, 1986.
Ebcioglu, Kemal and Nicolau Alexandru, "A global resource–constrained parallelization technique", *Scheduling*, pp. 154–163, 1989.
James C. Dehnert et al., "Compiling for the Cydra 5", *The Journal of Supercomputing*, 7, pp. 181–227 (1993).
Bernstein, David and Michael Rodeh, "Global Instruction Scheduling for Superscalar Machines", *Proceedings of the ACM SIGPLAN '91 Conference on Programming Language Design and Implementation*, Toronto, Canada, Jun. 26–28, 1991, pp. 241–255, 1991.
Lowney, P. Geoffrey et al., "The Multiflow Trace Scheduling Compiler", *The Journal of Supercomputing*, vol. 7, pp. 51–55, 1993.

*Primary Examiner*—Robert B. Harrell
*Attorney, Agent, or Firm*—Sterne, Kessler, Goldstein & Fox P.L.L.C.

[57] ABSTRACT

A system and method of generating object code from an intermediate representation of source code is described. The intermediate representation includes a plurality of basic blocks each being represented by a plurality dam dependency graphs, wherein each data dependency graph comprises a plurality of nodes each corresponding to an instruction from the target computer instruction set. The present invention operates by selecting a source basic block (that is one of the basic blocks of the intermediate representation) and a target basic block (that is another of the basic blocks of the intermediate representation), and by identifying a maximal set of instructions contained in the source basic block that are movable from the source basic block to the target basic block without violating any data dependency relationships of the data dependency graphs. An overall cost model of aggregately moving instructions of the maximal set from the source basic block to the target basic block is generated. This cost model specifies an executable cost of moving each of the instructions of the maximal set from the source basic block to the target basic block. Then, the present invention aggregately moves one or more instructions of the maximal set from the source basic block to the target basic block according to the cost model to form the object code.

16 Claims, 18 Drawing Sheets

FIG. 4A

402 — R1 ← FAdd x, y

404 — A ← FAdd R1, B

FIG. 4B

SCHEDULING INFORMATION 316
IN OPERAND PATTERN 306

| | | |
|---|---|---|
| 406 — | OP1 | READ IN CYCLE 7 |
| 408 — | OP2 | READ IN CYCLE 7 |
| 410 — | RESULT | WRITTEN IN CYCLE 11 |

FIG. 4C

| FAdd (NODE 402) | | FAdd (NODE 404) | |
|---|---|---|---|
| CYCLE | ACTION | CYCLE | ACTION |
| 1 | | | |
| 2 | | | |
| 3 | | | |
| 4 | | | |
| 5 | | 1 | |
| 6 | | 2 | |
| 7 | READ x AND y | 3 | |
| 8 | | 4 | |
| 9 | | 5 | |
| 10 | | 6 | |
| 11 | WRITE R1 | 7 | READ R1 AND B |

4 CYCLE LATENCY (cycles 1–4)

|  |  | NORMAL LATENCY | BYPASS LATENCY |
|---|---|---|---|
| $TN_1 \leftarrow FAdd_1 \ A, B$ | RESULTS IN TN1: | 3 | 2 |
| $C \leftarrow FAdd_2 \ TN_1, D$ | READ TN1: | 1 | 1 |
|  | LATENCY | 2 | 1 |

FIG. 6D

602 → 604 — ADDER BYPASS ← $FAdd_1$ A, B

606 — C ← $FAdd_2$ ADDER BYPASS, D

FIG. 7

ALTERNATIVE TARGET DESCRIPTION TABLE 702

| | | |
|---|---|---|
| $FAdd_A$ | READ OP1 FROM REGISTER FILE | READ OP2 FROM REGISTER FILE |
| $FAdd_B$ | READ OP1 FROM REGISTER FILE | READ OP2 FROM ADDER BYPASS |
| $FAdd_C$ | READ OP1 FROM ADDER BYPASS | READ OP2 FROM REGISTER FILE |
| $FADD_D$ | READ OP1 FROM ADDER BYPASS | READ OP2 FROM ADDER BYPASS | cpl(TARGET) = 2

| NODE | ESTART | LSTART | CLASSIFICATION | COST OF MOVEMENT |
|---|---|---|---|---|
| $T_1$ | 0 | 0 | | |
| $T_2$ | 0 | 0 | | |
| $T_3$ | 1 | 1 | | |
| $S_1$ | 0 | 1 | PROFITABLE | 1 |
| $S_2$ | 2 | 2 | NOT PROFITABLE | 1 |
| $S_3$ | 3 | 5 | NOT PROFITABLE | 2 |
| $S_4$ | 3 | 3 | NOT PROFITABLE | 2 |
| $S_5$ | 0 | 3 | DON'T CARE | 0 |
| $S_6$ | 4 | 4 | NOT PROFITABLE | 3 |
| $S_7$ | 5 | 5 | FIXED | $\infty$ |

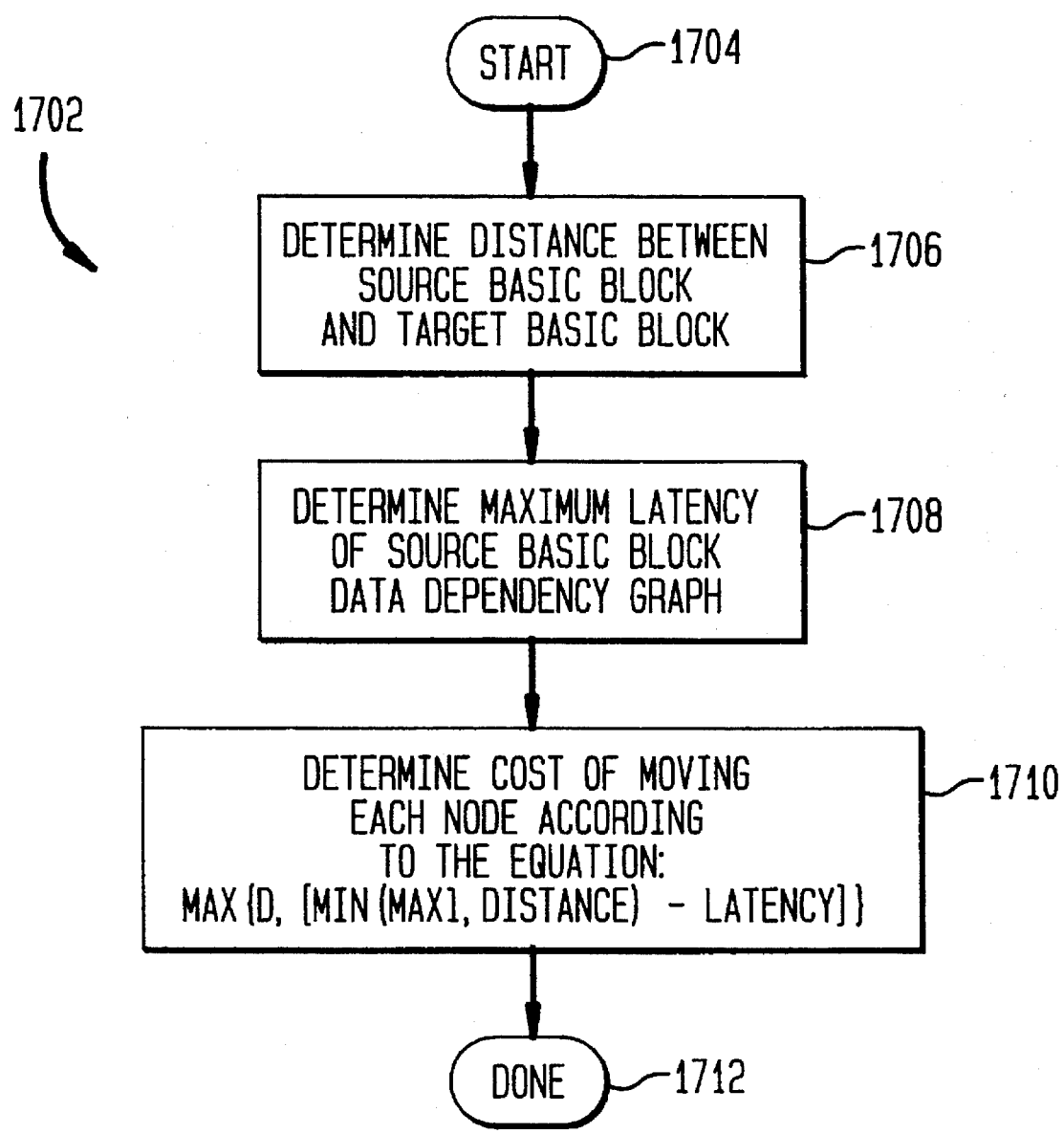

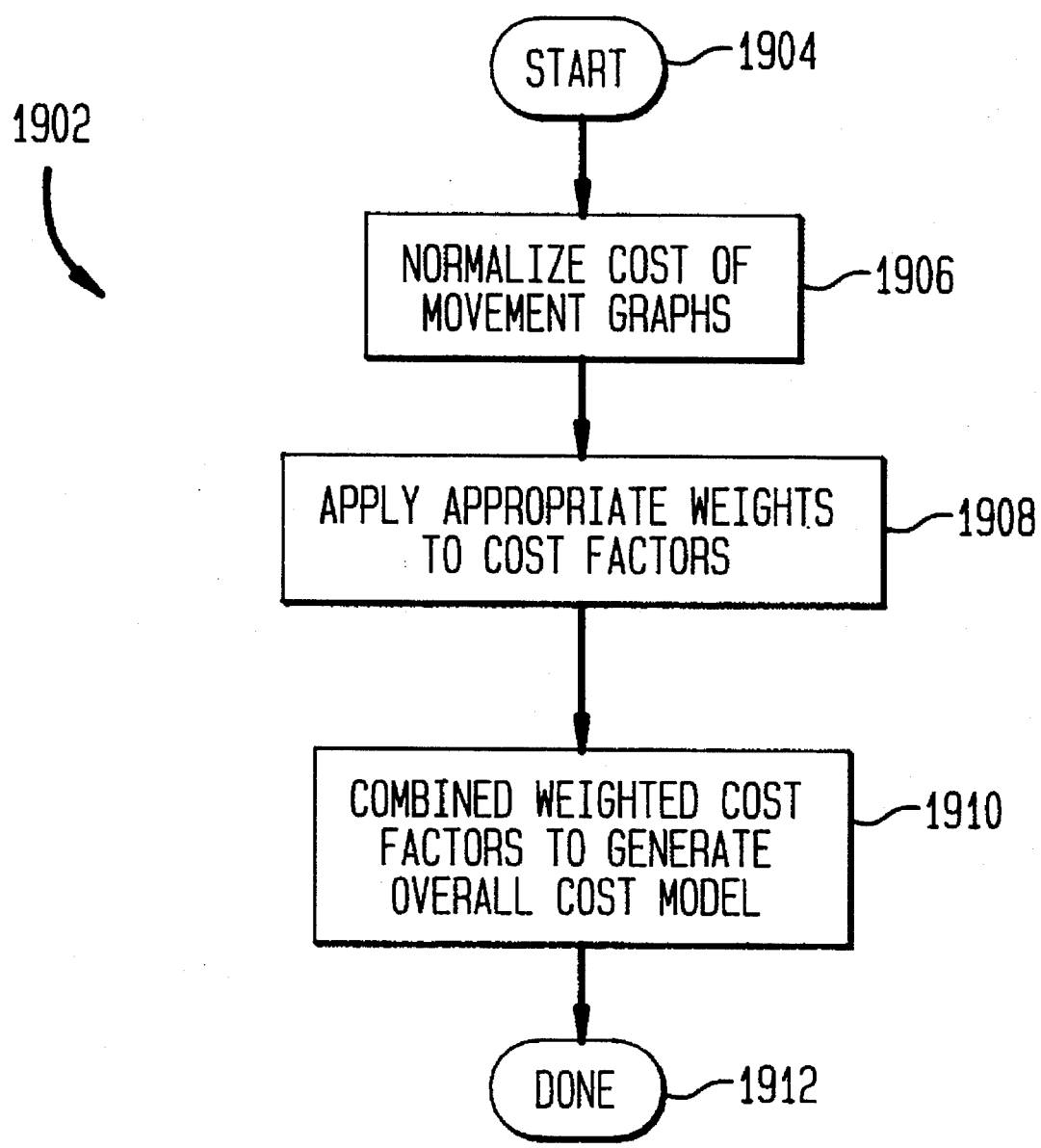

SYSTEM AND METHOD OF GENERATING OBJECT CODE USING AGGREGATE INSTRUCTION MOVEMENT

BACKGROUND OF THE INVENTION

1. Field of the Invention

The present invention relates generally to a software compiler system, and more particularly to a system and method in a software compiler system for aggregate instruction movement using a target description table.

2. Related Art

Most modern processors benefit from (or require) the rearrangement of operations to avoid inter-locks between instructions. For earlier processors, applying such scheduling rearrangement to a single basic block at a time is adequate. But with the advent of superscalar and VLIW (very large instruction word) architectures, instruction level parallelism (ILP) available at the basic block level is not sufficient to fully exploit the hardware resources available. Instead, code must be rearranged-beyond basic block boundaries to achieve higher ILP. This activity is called global scheduling, since most such algorithms incorporate scheduling.

Global scheduling specifically for inner loop bodies has been worked on extensively, with software pipelining in particular being in some cases an acceptable solution. This is described, for example, in Charlesworth, A. E., "An Approach to Scientific Array Processing: The Architectural Design of the AP- 120B/FPS-164, *IEEE Computer* 14(9): 18(1981). This is also described in Dehnert, J. C. and Towle, R. A., "Compiling for the Cydra 5," *J. Supercomputing* 7(½):181–227 (1993), which is herein incorporated by reference in its entirety. But global scheduling is also important outside loop bodies, and for dealing with those inner loop bodies which cannot be pipelined. Several approaches to this problem have been described in the literature, as will now be described.

Trace scheduling reduces the problem to a local scheduling problem by scheduling a trace (an acyclic path) in the flowgraph and allowing operations to move past branches or labels within the trace. Fix-up code is then inserted in the basic blocks that branch into the middle of traces (or are branched to form within traces) to correct for changes due to such movement past the branches. Trace scheduling handles loops by breaking traces at back arcs, depending on unrolling to mitigate the resultant inability to move code past those arcs. Trace scheduling is described, for example, in Lowney, P. G. et al., "The Multiflow Trace Scheduling Compiler," *J. Supercomputing* 7(½):51–142 (1993); Ellis, J., *Bulldog: A Compiler for VLIW Architectures*, MIT Press, Cambridge, Mass. (1986); and Fisher, J. A., "Trace Scheduling: A Technique for Global Microcode Compaction," *IEEE Transactions on Computers* C-30(7):478–490 (1981).

Percolation scheduling is a greedy algorithm which increases ILP by moving operations upward as much as possible. Because it ignores resource requirements, operations that are executed with small probability consume resources that could otherwise perform useful work. Percolation scheduling is described, for example, in Nicolau, A., *A Fine-Grain Parallelizing Compiler*, Tech. Report No. 86-792, Cornell Univ. (1986).

Enhanced percolation scheduling addresses this problem by delaying movement of operations until scheduling time. This postpones the movement decisions until actual machine resource requirements are known, restraining movement of operations that would exceed resource availability. Enhanced percolation scheduling is described, for example, in Ebcioglu, K. and Nicolau, A., "A Global Resource-Constrained Parallelization Technique," *Proceedings 3rd Int'l Conf. Supercomputing*, pp. 154–163 (1989).

Global instruction scheduling permits the equivalent and speculative movement of operations beyond basic block boundaries within the scope of an enclosing loop. An enhanced block scheduler improves the ILP of a basic block by considering operations from its "neighbor and peer" blocks. Code duplication is avoided in their initial implementation, but loops are handled by copying the first basic block to the end of the loop. Global instruction scheduling is described, for example, in Bernstein, D. and Rodeh, M., "Global Instruction Scheduling for Superscalar Machines," *Proc. SIGPLAN '91 Conf. Programming Language Design & Implementation*, pp. 241–255 (1991).

All of these techniques move a single operation at a time, either explicitly or implicitly by scheduling it outside its original basic block. This limits their ability to make truly global tradeoffs in deciding where to place operations. It increases the cost of compiler decision-making by making the choices for each operation, and often requires update of dependency information after each decision. It also introduces significant biases into the decisions which are made.

In particular, trace scheduling optimizes the first traces scheduled at the cost of fixup code on the side traces, even if they have equal execution frequency. Percolation scheduling moves operations upward even if doing so is detrimental. Enhanced percolation scheduling suppresses motion which exceeds resource availability, but will still do useless motion which increases resource requirements. Global instruction scheduling, like enhanced percolation scheduling, constrains motion based on available resources, but cannot balance resource usage.

SUMMARY OF THE INVENTION

The present invention is directed to a system and method of generating object code from an intermediate representation of source code. The object code is adapted for execution on a target computer having an instruction set.

The intermediate representation includes a plurality of basic blocks each being represented by a plurality data dependency graphs. Each data dependency graph comprises a plurality of nodes each corresponding to an instruction from the target computer instruction set.

The present invention operates by selecting a source basic block (that is one of the basic blocks of the intermediate representation) and a target basic block (that is another of the basic blocks of the intermediate representation). The present invention identifies a maximal set of instructions contained in the source basic block that are movable from the source basic block to the target basic block without violating any data dependency relationships of the data dependency graphs.

Then, the present invention generates an overall cost model of aggregately moving instructions of the maximal set from the source basic block to the target basic block. This cost model specifies an executable cost of moving each of the instructions of the maximal set from the source basic block to the target basic block. The present invention aggregately moves zero or more instructions of the maximal set from the source basic block to the target basic block according to the cost model to form the object code.

Selected features and advantages of the present invention shall now be considered.

The present invention separates the operation movement decisions from instruction scheduling. It is thus a separate, self-contained transformation phase with significant freedom in where it may be applied within the compiler. It may use as much or as little global information in its decisions as is available and cost-effective.

The present invention considers all legally movable operations in a basic block for code motion at once, and moves them as an aggregate, thus limiting the overhead of incremental update.

The present invention is based on a network flow model of the code motion problem, allowing it to use traditional minimum cut algorithms to choose the operations to move.

The present invention generates a unified cost model of operation movement, combining critical path length, register pressure, and latency subsumption goals in a single flow capacity function. This model is flexible in that the weights of its components can be adjusted for different situations, and additional components can be handled in the same manner.

The present invention operates with pairs of basic blocks (not always adjacent) at a time, iterating over the flowgraph to produce extended motion.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIG. 4A illustrates a portion of an example data dependency graph, FIG. 4B illustrates a portion of an example target description table, and FIG. 4C illustrates a table containing scheduling information for the data dependency graph of FIG. 4A. FIGS. 4A–4C are used to describe the manner in which the target description table of the present invention can be used to determine the latency of instructions;

FIG. 6C illustrates a table containing, scheduling information for the data dependency graph of FIG. 6A, and FIG. 6D illustrates the data dependency graph of FIG. 6A as modified according to the scheduling information of FIG. 6C; FIGS. 5 and 6A–6D are used to describe the manner in which the target description table of the present invention can be employed to utilize bypass paths where possible;

FIG. 7 illustrates a target description table according to an alternate embodiment of the present invention;

FIG. 17 is a flow chart depicting the manner in which the present invention generates a latency subsumption cost model;

FIG. 19 is a flow chart depicting the manner in which the present invention generates an overall cost of movement model from a critical path length cost model, a register pressure cost model, and a latency subsumption cost model;

DETAILED DESCRIPTION OF THE PREFERRED EMBODIMENTS

1.0 Overview of the Present Invention

Figure 1:
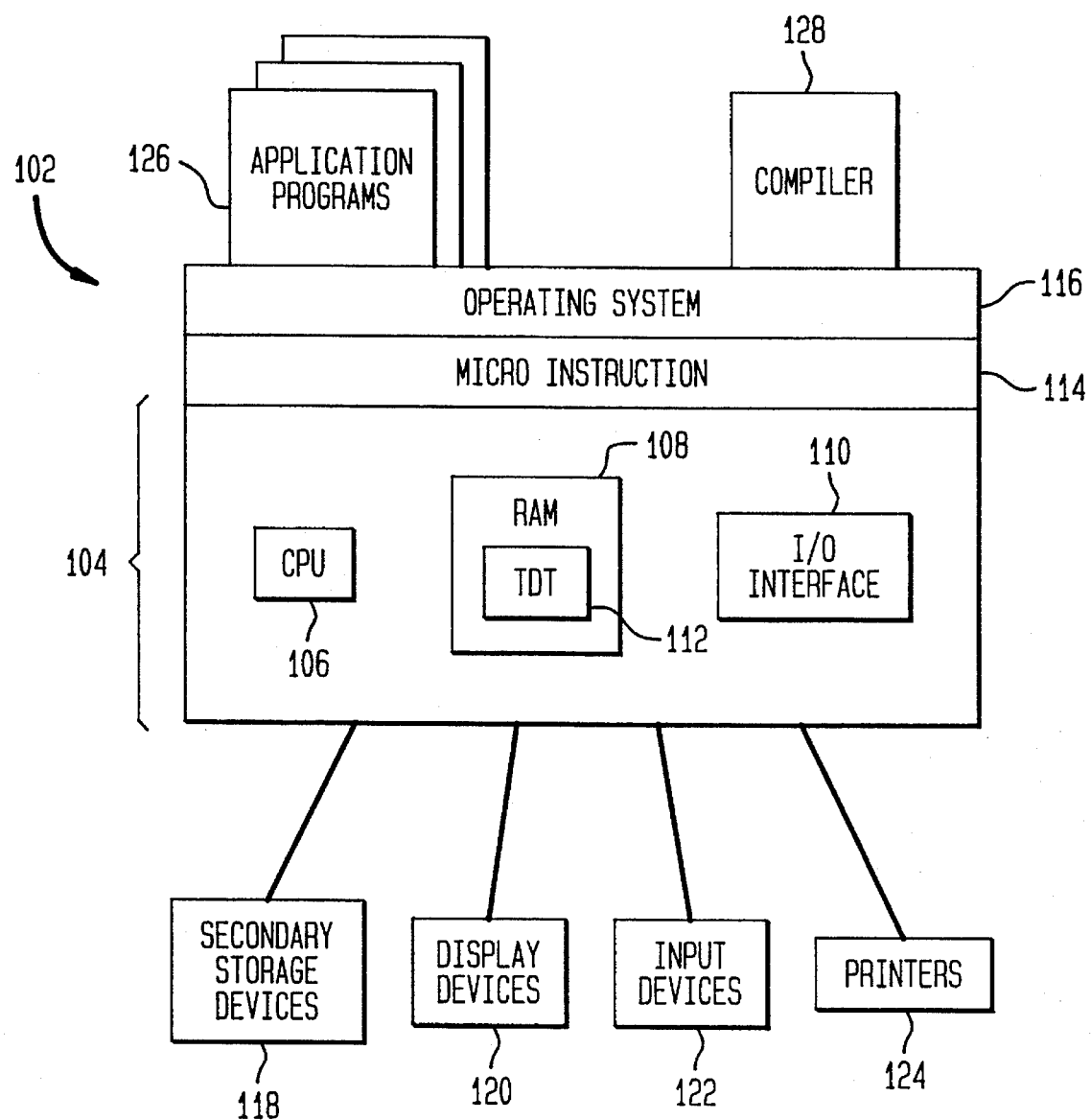
FIG. 1 is a high-level block diagram of a preferred computer platform in which the present invention preferably operates.

FIG. 1 is a block diagram of a computer platform 102 in which a software compiler system 128 of the present invention preferably operates. Alternatively, the present invention includes the software compiler system 128 in combination with the computer platform 102.

The computer platform 102 includes hardware units 104 including one or more central processing units (CPU) 106, a random access memory (RAM) 108, and an input/output (I/O) interface 110. The computer platform 102 also includes an operating system 116, and may include microinstruction code 114. Various peripheral components are connected to the computer platform 102, such as secondary storage devices 118 (such as a hard drive), display devices 120 (such as a monitor), input devices 122 (such as a keyboard and/or a mouse), and printers 124.

A target description table (TDT) 112 is part of the compiler 128 and is stored in the RAM 108 (assuming that the compiler 128 resides in the RAM 108). Alternatively, portions of the TDT 112 are stored in the RAM 108, and other portions of the TDT 112 are stored in one or more of the secondary storage devices 118.

A number of application programs 126 operate on the compiler platform 102, including the software compiler 128 of the present invention. The application programs 126 and the software compiler 128 may operate sequentially on the computer platform 102, but preferably operate in parallel on the computer platform 102. The application programs 126 do not form a part of the present invention, and therefore will not be described further.

The software compiler 128 includes instructions which, when executed in the computer platform 102, enable the computer platform 102 to perform particular functions. The operation of the software compiler 128 is described in detail below.

In a preferred embodiment of the present invention, the computer platform 102 is the Power Challenge computer system manufactured by Silicon Graphics Inc. of Mountain View, Calif. The operating system 116 is preferably the IRIX operating system manufactured by Silicon Graphics Inc. of Mountain View, Calif. The software compiler 128 is preferably written in the C computer programming language.

Figure 2:
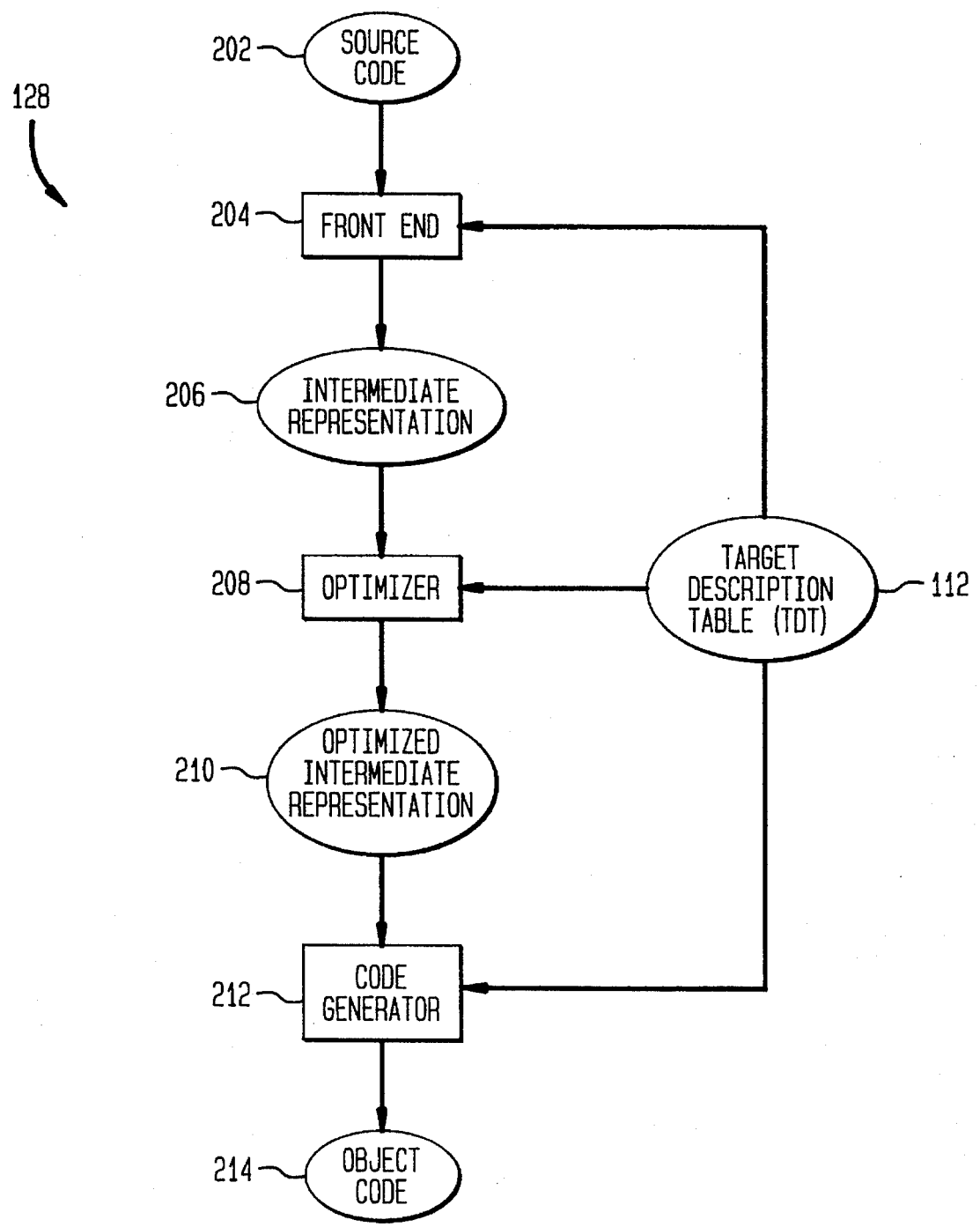
FIG. 2 is a high-level block diagram of a software compiler system according to a preferred embodiment of the present invention.

As shown in FIG. 2, the software compiler 128 of the present invention preferably includes a front end portion (also called the front end) 204, an optimizer portion (also called the optimizer) 208, and a code generator portion (also called the code generator) 212. The operation of the software compiler 128 shall now be generally described.

The front end 204 receives as input source code 202 (which may be stored in the RAM 108 and/or the secondary storage devices 118) and generates an intermediate representation (IR) 206 of the source code 202. The IR 206 includes a number of basic blocks. A basic block is a sequence of intermediate instructions with a single entry at the top and a single exit at the bottom.

Each basic block may be represented as one or more independent data dependency graphs each comprising one or more nodes. Each node generally represents an instruction which, when executed in a target machine, enables the target machine to perform a function associated with the instruction (the target machine is described below). In a data dependency graph, operation of a subsequent node may be dependent on dam generated and/or a variable created in a prior node (wherein the prior node is so named because it executes prior to the subsequent node). However, operation of the prior node is not dependent on data generated and/or a variable created in the subsequent node (unless a loop exists such that the subsequent node executes before the prior node).

The optimizer 208 optimizes the IR 206 to produce an optimized intermediate representation (IR) 210 (the optimized IR 210 also includes basic blocks which may be represented as one or more data dependency graphs each comprising one or more nodes). The code generator 212 generates object code 214 (which may be stored in the RAM 108 and/or the secondary storage devices 118) from the optimized IR 210. The object code 214 (after linking by a linker, not shown) may be executed in a target machine (not shown). Preferably, the target machine is a Power Challenge computer system manufactured by Silicon Graphics Inc. of Mountain View, Calif.

The front end 204, the optimizer 208, and the code generator 212 are well known and are described in many publicly available documents, such as *Compilers: Principles, Techniques, and Tools* by Alfred V. Aho, Ravi Sethi, and Jeffrey D. Ullman (AddisonWesley Publishing Company, Reading, Mass., March 1988), which is herein incorporated by reference in its entirety.

While generating the object code 214 from the optimized IR 210, the code generator 212 schedules for execution the nodes in the data dependency graphs of the optimized IR 210. In other words, the code generator 212 determines when each node in the optimized IR 210 will execute relative to the execution of all of the other nodes in the optimized IR 210.

While performing this scheduling function, the code generator 212 may move instructions from a subsequent basic block (called herein a source basic block) to a prior basic block (called herein a target basic block), wherein the prior basic block is so named because it executes before the subsequent basic block. The code generator 212 performs this instruction movement operation when it is profitable to do so from an execution viewpoint (that is, when such instruction movement would result in a faster executing and more resource-efficient object code 214).

The code generator 212 of the software compiler 128 of the present invention performs this instruction movement function in a novel manner wherein multiple instructions are simultaneously identified and moved from a source basic block to a target basic block. In other words, the code generator 212 performs aggregate instruction movement. This aspect of the present invention is discussed in detail below.

Conventionally, machine specific information (such as the identity of instructions, the latency of instructions, the number and type of registers utilized by instructions, etc.) is embedded into compilers. Consequently, compilers have conventionally been machine specific (that is, conventional compilers generate object code which is only suitable for execution in specific computers).

According to the present invention, most machine specific information is encapsulated in a target description table (TDT) 112. Thus, the TDT 112 operates to describe the target machine in which the object code 214 produced by the compiler 128 is adapted to execute.

Machine specific information is not embedded into the compiler 128 of the present invention. Instead, as shown in FIG. 2, the compiler 128 extracts machine specific information as necessary from the TDT 112 to produce the object code 214 (which is machine specific). Thus, the compiler 128 of the present invention is machine specific. The compiler 128 can be configured to generate object code for a particular computer by providing a target description table which includes machine specific information describing the computer. The TDT 112 according to the present invention is discussed in detail below.

2.0 Target Description Table

Figure 3A:
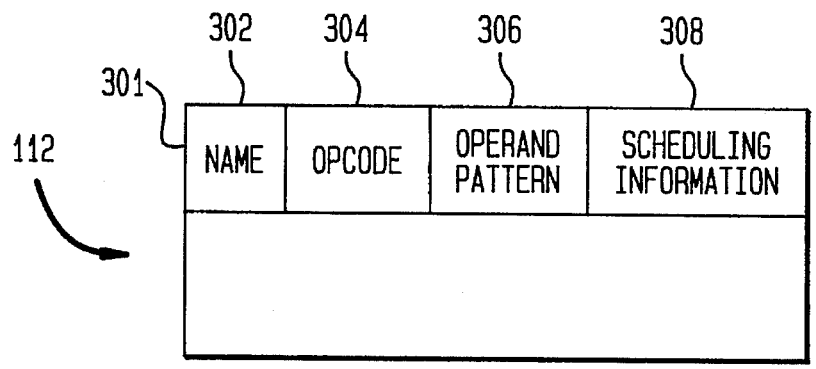
FIG. 3A illustrates a target description table according to a preferred embodiment of the present invention.

A target description table (TDT) 112 according to a preferred embodiment of the present invention is shown in FIG. 3A. The TDT 112 includes a plurality of entries 301, wherein each of the entries 301 corresponds to an instruction of the instruction set of the target machine (that is, the computer which the TDT 112 describes). Each of the entries 301 includes a name field 302, an operation code (opcode) field 304, an operand pattern field 306, and a scheduling information field 308.

The name field 302 includes the name of an instruction, such as "FADD" (for floating point addition) and "FMULT" (for floating point multiplication). The opcode field 304 includes the opcode of the instruction named in the name field 302.

Figure 3B:
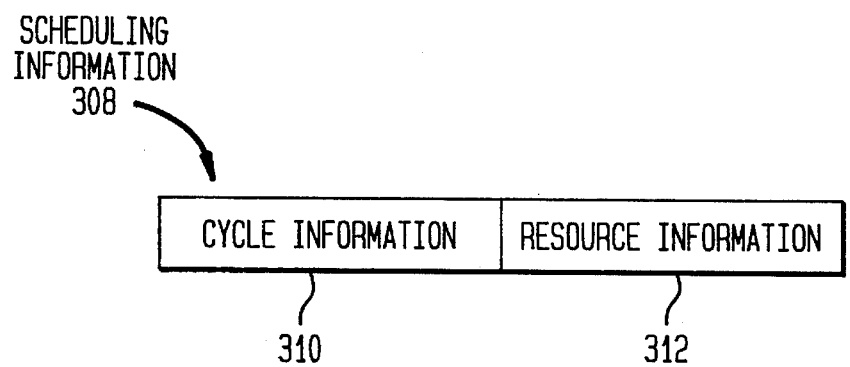
FIG. 3B illustrates a scheduling information field according to a preferred embodiment of the present invention.

The scheduling information field 308 includes scheduling-information for the instruction named in the name field 302 which is specific to the target machine. Specifically, referring to FIG. 3B, the scheduling information field 308 includes a cycle information sub-field 310 and a resource information sub-field 312.

The cycle information sub-field 310 includes information which specifies the cycles when the operands of the instruction are accessed. The cycle information sub-field 310 also includes information which specifies the cycles when the results of the instruction are written. The resource information sub-field 312 includes information which specifies the cycles when resources are required for operation of the instruction named in the name field 302.

Figure 3C:
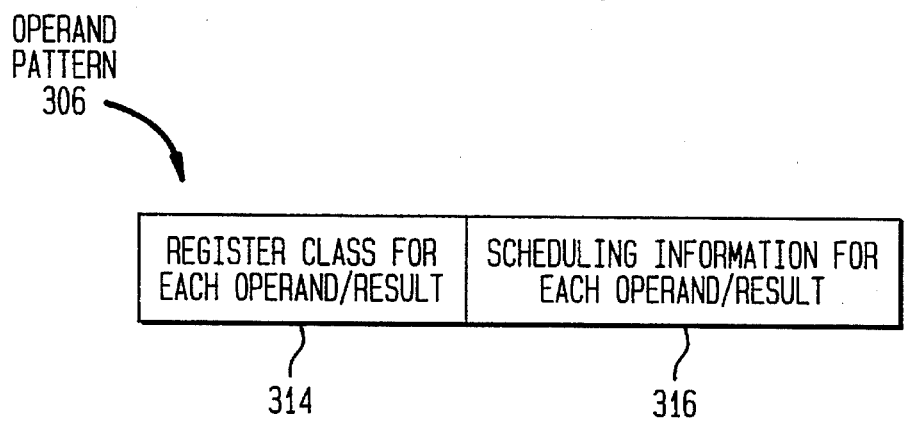
FIG. 3C illustrates an operand pattern field according to a preferred embodiment of the present invention.

The operand pattern field 306 includes information pertaining to the operands and results of the instruction named in the name field 302 which is specific to the target machine. Specifically, referring to FIG. 3C, the operand pattern field 306 includes for each operand and result of the instruction a register class sub-field 314 and a scheduling information sub-field 316.

If an operand or result of the instruction is to be stored or accessed from a register, then the register class sub-field 314 includes information which identifies the required register class of the register. Register classes are machine specific and, depending on the particular machine architecture, may include an long integer register class, a short integer register class, and a floating point register class. The scheduling information sub-field 316 includes target machine specific scheduling information pertaining to a particular operand or result of the instruction, such that complete scheduling information pertaining to the instruction named in the name field 302 is represented by the union of the operand pattern field 306 and the scheduling information field 308.

According to the present invention, the compiler 128 refers to the TDT 112 to generate scheduling related information such as the latency of an instruction, the critical path length of a data dependency graph, the earliest start (also called estart) and latest start (also called lstart) of an instruction, and the number of registers necessary when passing from one basic block to another basic block.

Consider, for example, the manner in which the compiler 128 calculates the latency of an instruction. Such operation of the compiler 128 shall be described which reference to FIGS. 4A–4C, wherein FIG. 4A illustrates a data dependency graph comprising a first node 402 and a second node 404 (only a portion of the data dependency graph is shown). The first node 402 corresponds to a first floating point addition instruction (having a name "FADD") which adds a first operand "X" to a second operand "Y" to generate a result "R1" The second node 404 corresponds to a second floating point addition instruction which adds a first operand "R1" to a second operand "B" to generate a result "A"

FIG. 4B illustrates a portion of the scheduling information sub-field 316 in the operand pattern field 306 for the entry 301 in the TDT 112 corresponding to the FADD instruction. This portion of the scheduling information sub-field 316 includes an entry for the first operand "OP1," the second operand "OP2," and the result of the FADD instruction, and specifies that OP1 and OP2 are read during cycle 7 of the FADD instruction and the result is written during cycle 11 of the FADD instruction.

The compiler 128 uses this information to calculate the latency of the instruction at node 402 as shown in FIG. 4C (only some of the cycles of the second FADD instruction are shown in FIG. 4C, as indicated by arrow 412). Specifically, since the first FADD instruction writes its result to R1 and the second FADD instruction reads its OP1 from R1, cycle 11 of the first FADD instruction (where the result is written to R1) must correspond to cycle 7 of the second FADD instruction (where OP1 is read from R1).

Working backwards, cycle 1 of the second FADD instruction must correspond to cycle 5 of the first FADD instruction. Thus, the second FADD instruction can staff no earlier than four cycles after the first FADD instruction starts. In other words, the latency of the first FADD instruction at node 402 is four cycles. It should be noted that other factors may be considered by the compiler 128 when determining the latency of instructions.

As noted above, the compiler 128 refers to the TDT 112 to generate other scheduling related information such as the critical path length of a data dependency graph, the earliest start and the latest staff of an instruction, and the number of registers necessary when passing from one basic block to another basic block. The manner in which the compiler 128 generates this scheduling related information will be apparent to persons skilled in the relevant art based on the discussion contained herein.

The structure of the TDT 112 of the present invention enables the compiler 128 to generate run-time efficient object code (that is, object code which takes less cycles to execute and which requires less resources to execute). In particular, the structure of the TDT 112 of the present invention enables the compiler 128 to advantageously schedule the use of bypass paths in the architecture of the target computer. This feature of the present invention is described below which reference to FIGS. 5 and 6A–6D.

Figure 5:
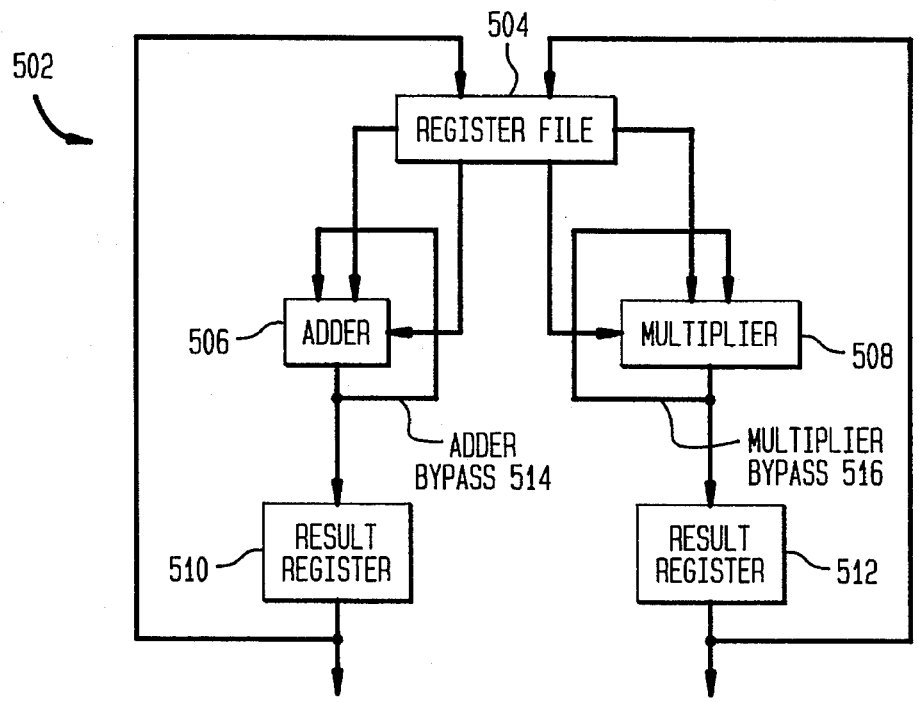
FIG. 5 is a block diagram of an example computer architecture containing adder and multiplier bypass paths.

FIG. 5 is a block diagram of a target computer 502 according to a preferred embodiment of the present invention (only a portion of the target computer 502 is shown). The target computer 502 includes a register file 504 for storing operands and results, and a number of functional units such as an adder 506 and a multiplier 508. Results from the adder 506 are transferred to the register file 504 via a result register 510. Similarly, results from the multiplier 508 are transferred to the register file 504 via the result register 512.

The target computer 502 also includes an adder bypass path 514 which connects the output of the adder 506 to the input of the adder 506, and a multiplier bypass path 516 which connects the output of the multiplier 508 to the input of the multiplier 508.

Figure 6A:
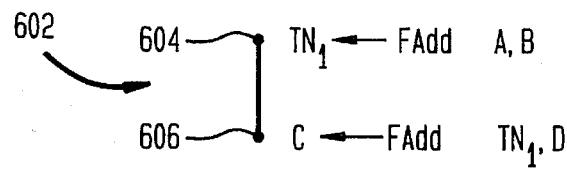
FIG. 6A illustrates a portion of an example data dependency graph.

Consider now FIG. 6A, which illustrates a data dependency graph 602 comprising a first node 604 and a second node 606 (only a portion of the data dependency graph 602 is shown). The first node 604 corresponds to a first floating point addition instruction (having a name "FADD") which adds a first operand "A" to a second operand "B" to generate a result "TN1". The second node 606 corresponds to a second floating point addition instruction which adds a first operand "TN 1" to a second operand "D" to generate a result "C".

Since the second FADD instruction uses as an operand the result TN1 of the first FADD instruction, it is most likely more efficient to use the adder bypass path 514 to transfer the result TN1 of the first FADD instruction from the output of the adder 506 to the input of the adder 506. The compiler 128 refers to the TDT 112 to determine whether it is possible to efficiently use the adder bypass path 514 in this situation.

Figure 6B:
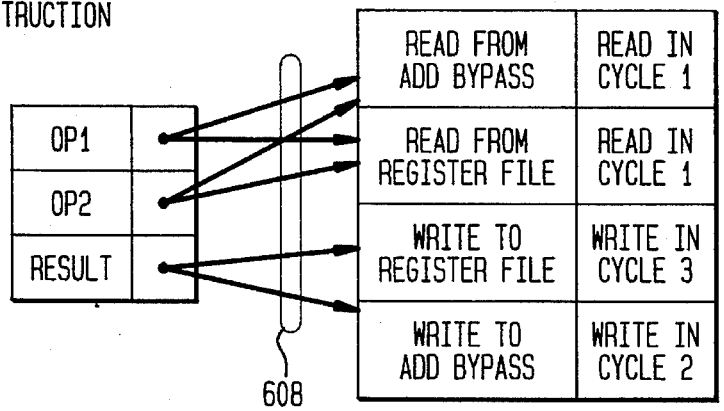
FIG. 6B illustrates a portion of an example target description table.

Specifically, referring to FIG. 6B, the compiler 128 refers to a portion of the scheduling information sub-field 316 in the operand pattern field 306 for the entry 301 in the TDT 112 corresponding to the FADD instruction. This portion of the scheduling information sub-field 316 includes an entry for the first operand "OPI," the second operand "OP2," and the result "result" of the FADD instruction.

As indicated in the scheduling information sub-field 316, OP1 and OP2 can be read from the adder bypass path 514 during cycle 1 of the FADD instruction, or from the register file 504 during cycle 1. The result can be written to the register file 504 during cycle 3 of the FADD instruction, or can be written to the adder bypass path 514 during cycle 2.

The compiler 128 then determines whether it is profitable and possible from an execution standpoint to use the adder bypass path 514 as shown in FIG. 6C. As shown in FIG. 6C, when the adder bypass path 514 is not used the first FADD instruction writes the result TN1 during cycle 3, whereas when the adder bypass path 514 is used the first FADD instruction writes the result TN1 during cycle 2. The second FADD instruction reads TN1 during cycle 1 when the adder bypass path 514 is used or not used.

Thus, according to the procedure discussed above with reference to FIGS. 4A–4C, the latency of the first FADD instruction is 2 when the adder bypass path 514 is used, and 1 when the adder bypass path 514 is not used. Therefore, in the data dependency graph 602 if FIG. 6A, it is both possible and profitable to use the adder bypass path 514. Accordingly, in the data dependency graph 602 the compiler 128 replaces "TN1" with the adder bypass path 514, as shown in FIG. 6D.

Note that the scheduling information sub-field 316 includes pointers 608 to entries 610 in the TDT 112 which includes the scheduling information described above. In this manner, multiple scheduling information sub-fields 316 can refer as appropriate to the same entries 610 in the TDT 112, thereby reducing the size and memory requirements of the TDT 112.

The organization of the TDT 112 provides additional memory savings. Such memory savings are achieved by partitioning scheduling information between the operand pattern field 306 and the scheduling information field 308.

FIG. 7 illustrates an alternate target description table (TDT) 702 where the scheduling information is not so partitioned. This alternate TDT 702 includes an entry for each variation of each instruction.

Four example, four variations of the FADD instruction are shown, one for every combination of the source of the operands (where it is assumed that the operands can be accessed from the register file or the adder bypass path). Other variations of the FADD instruction would be required in the TDT 702 to account for combinations of operand sources and result destinations.

In contrast, the TDT 112 of the present invention includes a single entry for each instruction. Combinations of operand sources and result destinations are encapsulated in the scheduling information sub-field 316 of the operand pattern field 306 as shown, for example, in FIG. 6B. In the scheduling information sub-field 316, one entry is provided for each operand and result, wherein these entries preferably include pointers to other entries in the TDT 112 which includes scheduling information.

3.0 Aggregate Instruction Movement

The manner in which the compiler 128 (preferably the front end 204 of the compiler 128) of the present invention performs aggregate instruction movement shall now be described with reference to FIG. 8, which is a flowchart 801 illustrating the operation of the present invention. The flowchart 801 begins with step 802, wherein control passes immediately to step 804.

3.1 Identifying Source Basic Block—Target Basic Block Pairs

As noted above, the compiler 128 performs the aggregate instruction movement function by moving instructions from a source basic block (BB) to a target basic block (BB). In other words, the compiler 128 performs the aggregate instruction movement function with respect to pairs of basic blocks (wherein one of the basic blocks is the source BB and the other basic block is the target BB). Thus, in step 804, the compiler 128 identifies in the optimized IR 210 all of the pairs of basic blocks that are eligible for aggregate instruction movement. According to the present invention, there are four types of basic block pairs which are eligible for aggregate instruction movement: circular, equivalent, code duplication, and speculative.

Figure 9:
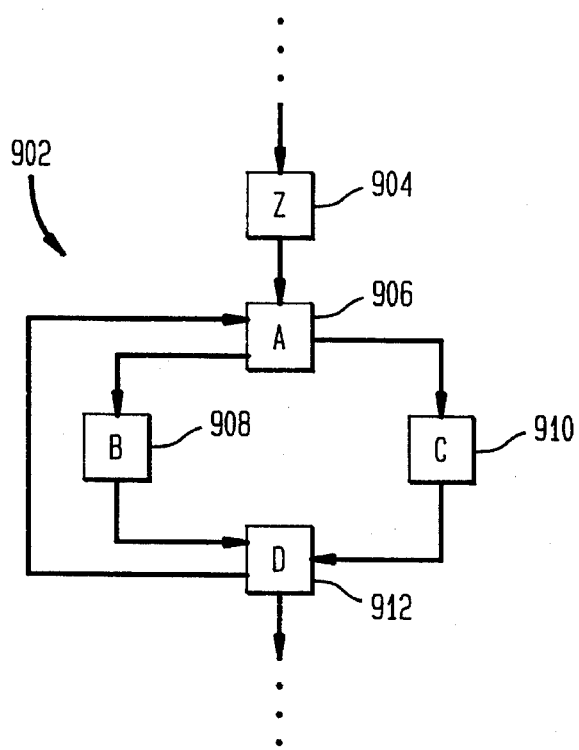
FIG. 9 is an example data dependency graph used for illustrating the manner in which the present invention selects pairs of source basic blocks and target basic blocks to process.

Two basic blocks are circular and thus eligible for aggregate instruction movement if one of the basic blocks (which becomes the source basic block) always executes after the other basic block or another basic block via a control loop (these become target basic blocks). The source basic block must be at the tail end of a back arc (that is, the control loop). One of the target basic blocks is at the head end of the back arc. In the case of the circular classification, instructions from the source basic block must be moved to both of the basic blocks which precede it in execution. Referring to FIG. 9, for example, basic blocks A and Z are eligible for aggregate instruction movement under the circular classification (with basic block Z being the target BB and basic block A being the source BB) because basic block A is always processed after basic block Z or basic block D via a control loop. If instructions are moved from basic block A to basic block Z, then the same instructions must also be moved to basic block D (in other words, basic blocks A and D are also eligible for aggregate instruction movement under the circular classification).

Two basic blocks are equivalent and are thus eligible for aggregate instruction movement if one of the basic blocks is always processed after the processing of the other basic block. Referring to FIG. 9, basic blocks A and D are equivalent (with basic block A being the target BB and basic block D being the source BB) because basic block D is always processed after the processing of basic block A. This is true, even though basic block B or basic block C is processed between the processing of basic blocks A and D.

Two basic blocks are eligible for aggregate instruction movement under the code duplication classification if one of the basic blocks (which becomes the source basic block) is always processed after the processing of the other basic block or one or more additional basic blocks. In the case of code duplication, instructions from the source basic block must be moved to all of the basic blocks which may execute before the source basic block. Referring to FIG. 9, basic blocks B and D are eligible for aggregate instruction movement under the code duplication classification (with basic block B being the target BB and basic block D being the source BB) because basic block D is always processed after basic block B or basic block C. If instructions are moved from basic block D to basic block B, then the same instructions must also be moved to basic block C (in other words, basic blocks C and D are also eligible for aggregate instruction movement under the code duplication classification).

Two basic blocks are eligible for aggregate instruction movement under the speculative classification if one of the basic blocks may be processed after the other basic block is processed. For example, in FIG. 9 basic blocks A and B are speculative (with basic block A being the target BB and basic block B being the source BB) since basic block B may be processed after basic block A (note that basic block C, rather than basic block B, may be processed after basic block A). Similarly, basic blocks A and C are speculative and are thus eligible for aggregate instruction movement.

Referring again to FIG. 8, in step 804, the compiler 128 also prioritizes the basic block pairs which it just identified (as described above). Higher priority basic block pairs are processed before lower priority basic block pairs in the remaining steps of the flowchart 801. Preferably, circular basic block pairs are assigned the highest priority, followed by equivalent basic block pairs and then code duplication basic block pairs. Preferably, speculative basic block pairs are assigned the lowest priority.

In step 806, the highest priority basic block pair (identified in step 804) which has not yet been processed is selected for processing.

3.2 Identifying the Maximal Set of Instructions Eligible for Movement From the Source Basic Block to the Target Basic Block In step 808, the compiler 128 identifies the maximal set of instructions that can be safely moved (from a data dependency point of view) from the source basic block to the target basic block of the basic block pair selected in step 806. In other words, during step 808 the compiler 128 identifies the maximal set of instructions that can be moved from the source basic block to the target basic block without violating any of the data dependency relationships inherent in the relevant data dependency graphs. For example, referring to FIG. 9, assume that basic blocks A and D are the target and source basic blocks, respectively. Also assume that basic block D has the following instructions in the order shown:

$A \leq FADD\ B, C$ $D \leq FMULT\ A, E$

The floating point multiplication operation (called FMULT) uses as an operand the results of the floating point addition operation (called FADD). Thus, the FMULT operation depends from a data dependency standpoint on the FADD operation. Consequently, the compiler 128 cannot move the FMULT operation to the target basic block without also moving the FADD operation, as doing otherwise would violate the data dependency relationship between the FADD and FMULT operations.

Figure 10:
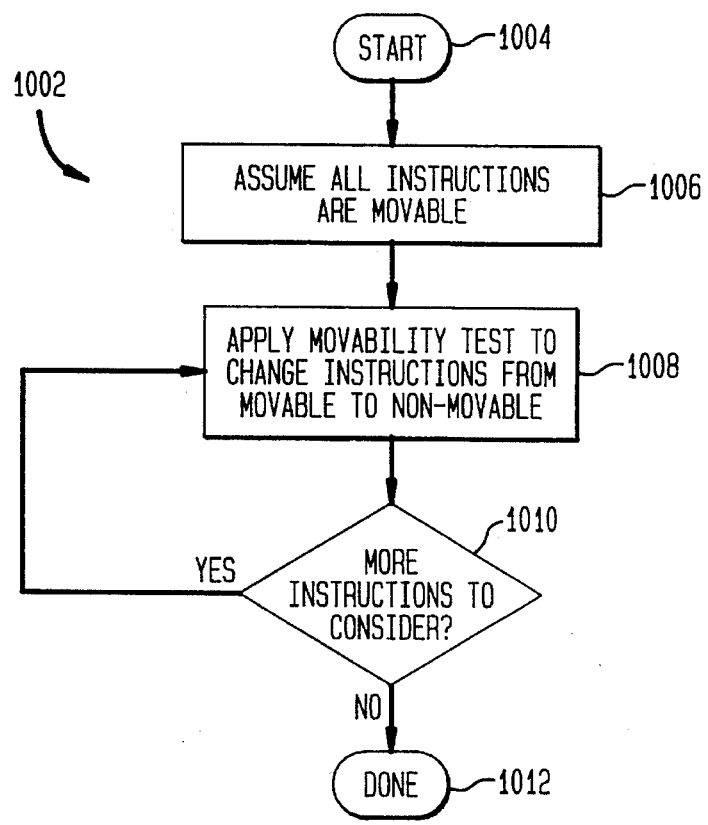
FIG. 10 is a flow chart depicting the manner in which the present invention identifies a maximal instruction set.

FIG. 10 is a flowchart 1002 that represents the detailed operation of the compiler 128 while performing step 808 according to a preferred embodiment of the present invention. The flowchart 1002 begins with step 1004, where control immediately passes to step 1006.

In step 1006, the compiler 128 makes the assumption that all of the instructions in the source basic block are movable (that is, safe to move) to the target basic block. The compiler 128 performs this step by tagging all of the instructions in the source basic block as being movable.

In step 1008, the compiler 128 selects an instruction from the source basic block and applies a movability test to determine whether the selected instruction is movable in fact. If the selected instruction is not actually movable, then the compiler 128 marks the selected instruction as being non-movable.

The movability test is as follows. An instruction is not movable if one or more of the following is true:

(1) The exception level that might be caused by movement of the instruction is higher than the allowable value specified in the optimizer options.

(2) Movement of the instruction would demand more resources than available.

(3) The instruction uses the results of some preceding non-movable instruction(s) in the same basic block, or the instruction defines some result and/or operands of preceding non-movable instructions.

(4) The basic block is considered for equivalent movement, and the instruction uses the result of some instruction(s) in the basic block(s) between them, or it defines their result and/or their operands.

(5) The basic block is considered for speculative or circular movement, and the instruction defines any variable that is "live out" at the target basic block. Live out is a well known term and is described in many publicly available documents, such as *Compilers: Principles, Techniques, and Tools* by Alfred V. Aho, Ravi Sethi, and Jeffrey D. Ullman, referenced above.

In step 1010, the compiler 128 determines whether there are any more instructions in the source basic block to process. If there are more instructions to process, then the compiler 128 returns to step 1008. Otherwise, this aspect of the compiler 128 is complete as indicated by oval 1012. The instructions in the source basic block which are still tagged as "movable" represent the maximal set of movable instructions.

3.3 Generating the Cost Model of Moving Instructions Between the Source and Target Basic Blocks In step 810, the compiler 128 generates a model of the cost of moving instructions of the maximal set (identified in step 808) from the source basic block to the target basic block. This cost model is later used by the compiler 128 (in step 812, described below) to identify the most profitable instructions (in terms of reducing execution time and minimizing resource utilization) of the maximal set to move from the source basic block to the target block. The compiler 128 then moves these identified, most profitable instructions from the source basic block to the target basic block (in step 814, described below).

Figure 11:
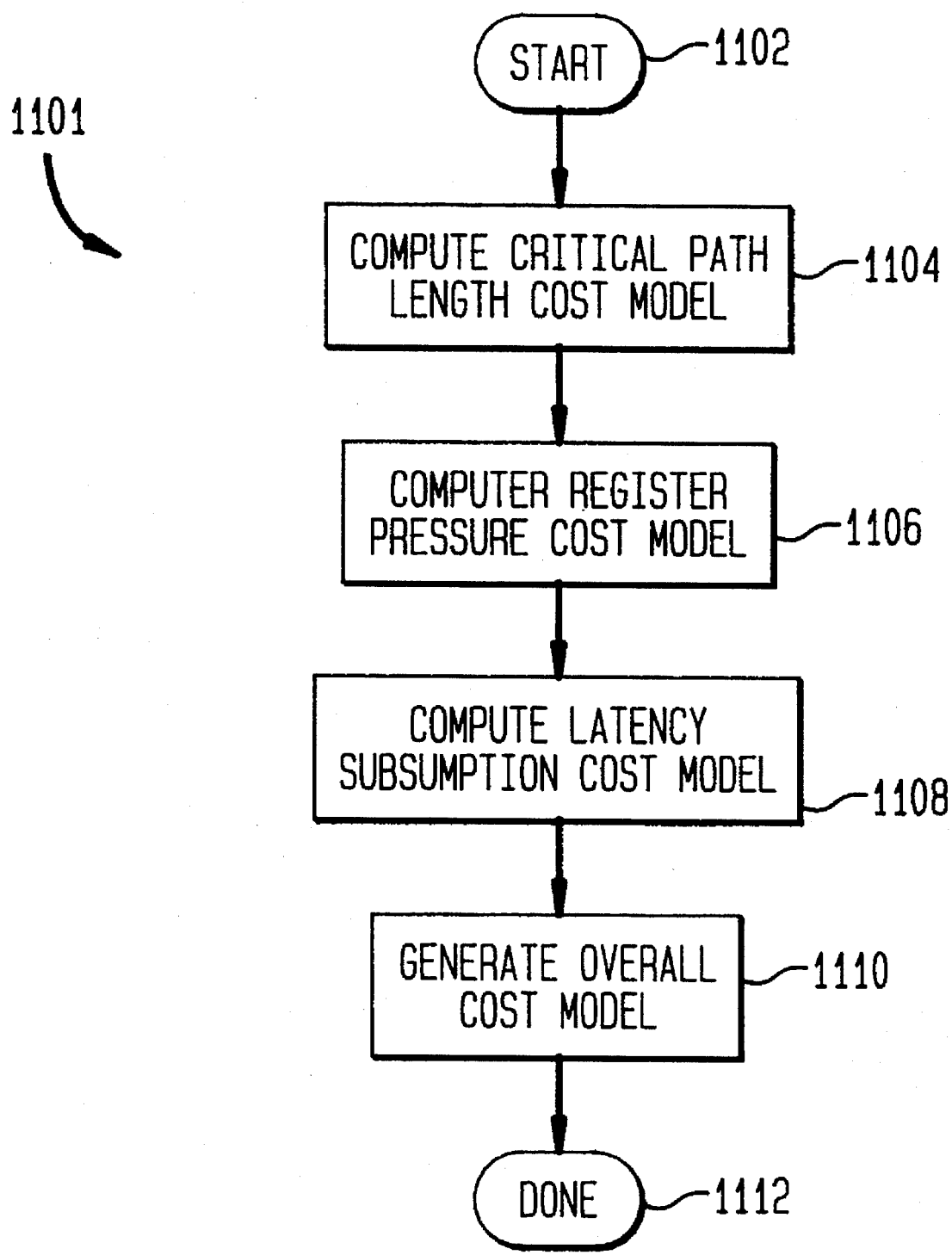
FIG. 11 is a flow chart depicting the manner in which the present invention generates a cost model of moving instructions from a source basic block to a target basic block.

Preferably, the compiler 128 in step 810 generates the cost of movement model based on three factors: critical path length, register pressure, and latency subsumption. In particular, referring to a flowchart 1101 shown in FIG. 11, the compiler 128 generates a cost of movement model based on critical path length (step 1104). The compiler 128 also builds a cost of movement model based on register pressure (step 1106), and a cost of movement model based on latency subsumption (step 1108). Then, the compiler 128 combines these three cost of movement models to thereby form an overall cost of movement model (step 1110). Referring again to FIG. 8, this overall cost of movement model is then used by the compiler 128 in steps 812 and 814 to select and move the most profitable instructions of the maximal set from the source basic block to the target basic block, as briefly described above (and as described in greater detail below).

The overall cost model is slightly different when there is more than one target basic block. If it is considered for circular movement, only the target basic block in the loop is used to build the cost model. If it is code duplication, then the cost model of all basic blocks are averaged.

Figure 12A:
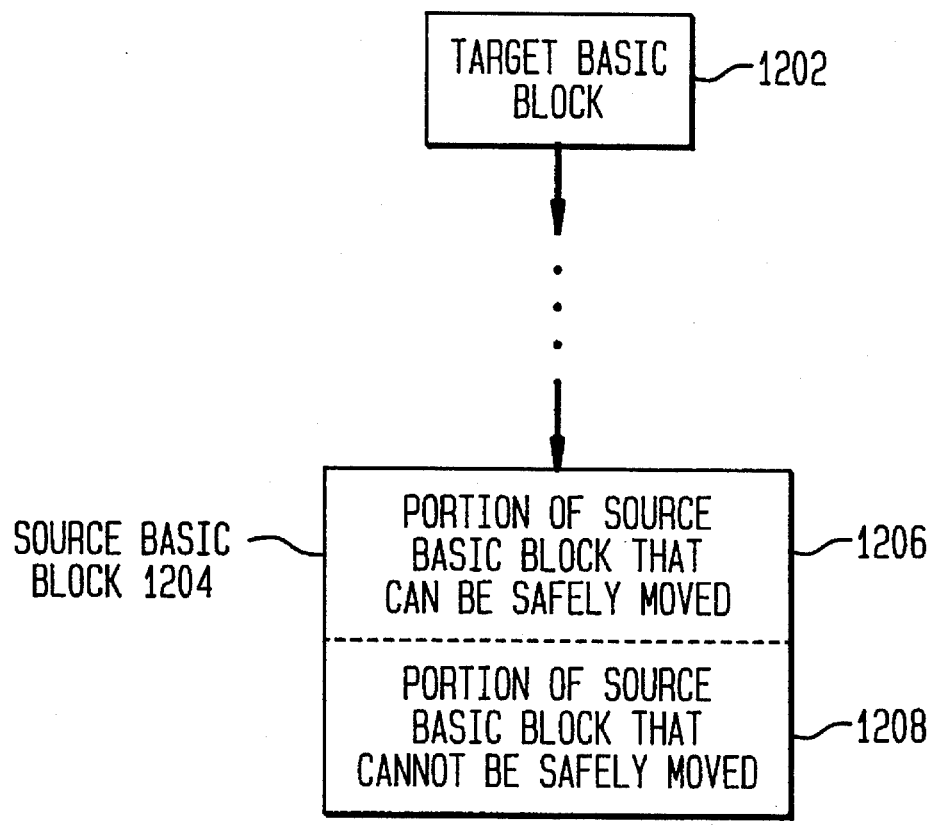
FIG. 12A depicts an example source basic block/target basic block pair prior to aggregate instruction movement.
Figure 12B:
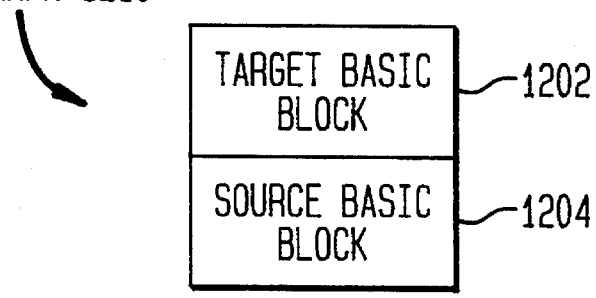
FIG. 12B depicts an example source basic block/target basic block pair subsequent to aggregate instruction movement.

When generating the critical path length and register pressure cost of movement models, the compiler 128 analyzes a combined source BB/target BB data dependency graph 1210. This is shown in FIG. 12B (also see FIG. 12A, which shows an example target basic block 1202 and source basic block 1204). The combined source BB/target BB data dependency graph is generated by linking the data dependency graphs in the target basic block 1202 to the data dependency graphs in the source basic block 1204, and then marking each instruction in the combined source BB/target BB data dependency graph as being a target instruction, a movable instruction, or a non-movable instruction.

When generating the latency subsumption cost of movement model, the compiler 128 does not analyze the combined source BB/target BB data dependency graph 1210. Instead, the compiler 128 analyzes the target basic block and the source basic block (actually, the portion of the source basic block that comprises instructions which are safe to move) as they exist in the optimized IR 210. Referring to FIG. 9, for example, if basic blocks A and D represent the target basic block and the source basic block, respectively, then the generation of the latency subsumption cost of movement model would include consideration of the basic blocks B and C which exist between basic blocks A and D.

Before discussing in detail the manner in which the compiler 128 generates the cost of movement models identified above, it will be illustrative to define the following terms: path length of a data dependency graph, earliest start of an instruction, and latest start of an instruction. It should be understood, however, that these terms are well known to persons of ordinary skill in the relevant art, and are discussed in many publicly available documents such as Dehnert, J. C. and Towle, R. A., "Compiling for the Cydra 5," *J. Supercomputing* 7(½): 181–227 (1993), referenced above.

The path length of a data dependency graph is the number of cycles which are required to execute the longest path through the data dependency graph.

Each instruction (or node) in a data dependency graph has an earliest start and a latest start. The earliest start (also called "estart") of an instruction is the earliest cycle that the instruction can begin executing without violating any data dependency relationships of the data dependency graph. The latest start (also called "lstart") of an instruction is the latest cycle that the instruction can begin executing without violating any data dependency relationships of the data dependency graph, and without forcing later completion of the basic block than its critical path length.

There are additional constraints when computing estart/lstart values for the combined source BB/target BB data dependency graph to ensure that fixed instructions (described below) do not start earlier than the completion of all target instructions. The lstart of target instructions must be less than the critical path length of the target basic block. The estart of fixed instructions must be greater than or equal to the critical path length of the target basic block. There are no additional constraints on movable instructions.

3.3.1 Generating the Critical Path Cost of Movement Model

Figure 13:
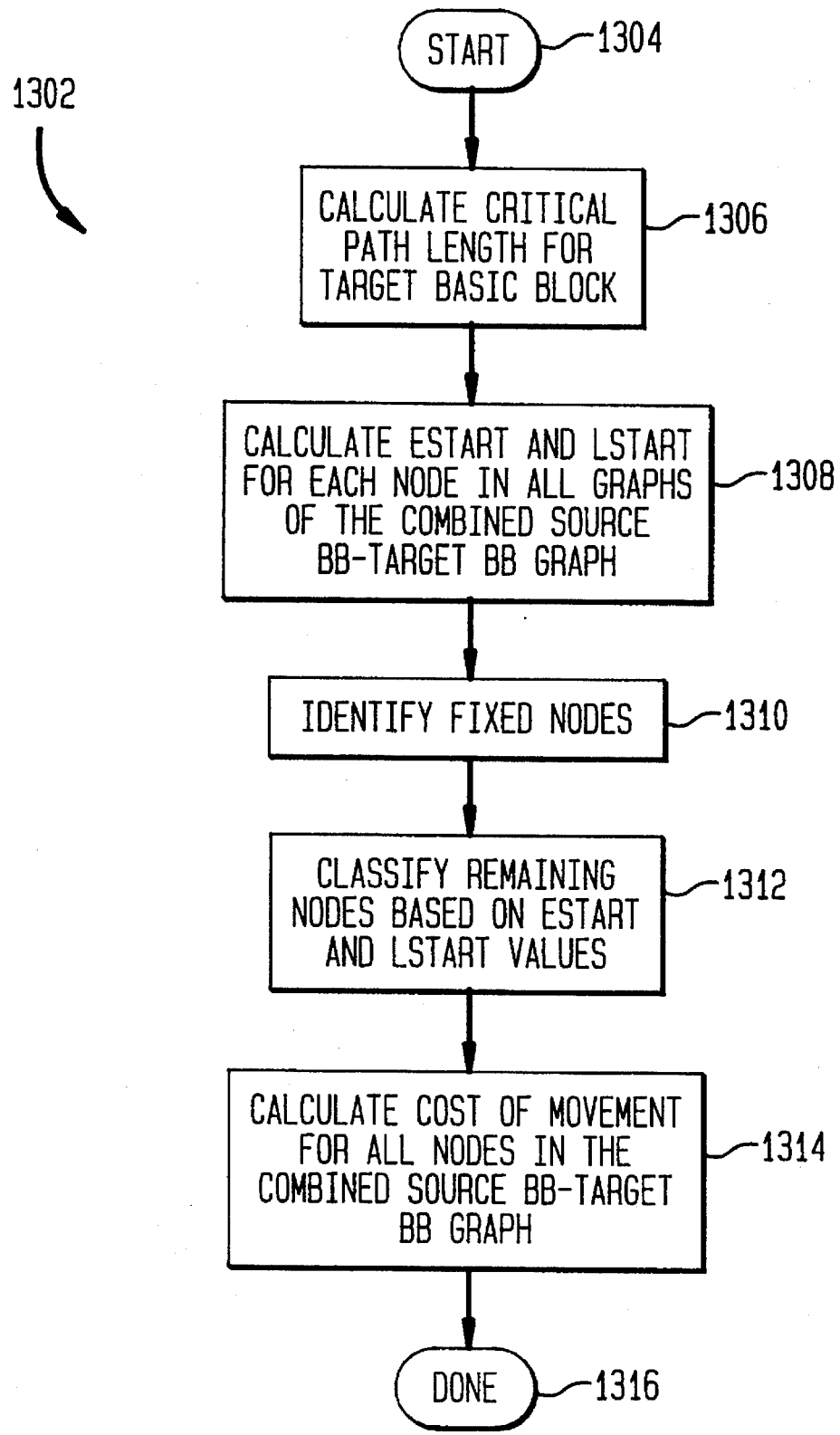
FIG. 13 is a flow chart depicting the manner in which the present invention generates a critical path length cost model.

The manner in which the compiler 128 generates a cost of movement model based on critical path length (step 1104 in FIG. 11) shall now be described in detail with reference to FIG. 13, which illustrates a flowchart 1302 depicting the operation of the present invention. The flowchart 1302 begins with step 1304, where control immediately passes to step 1306.

Figure 8:
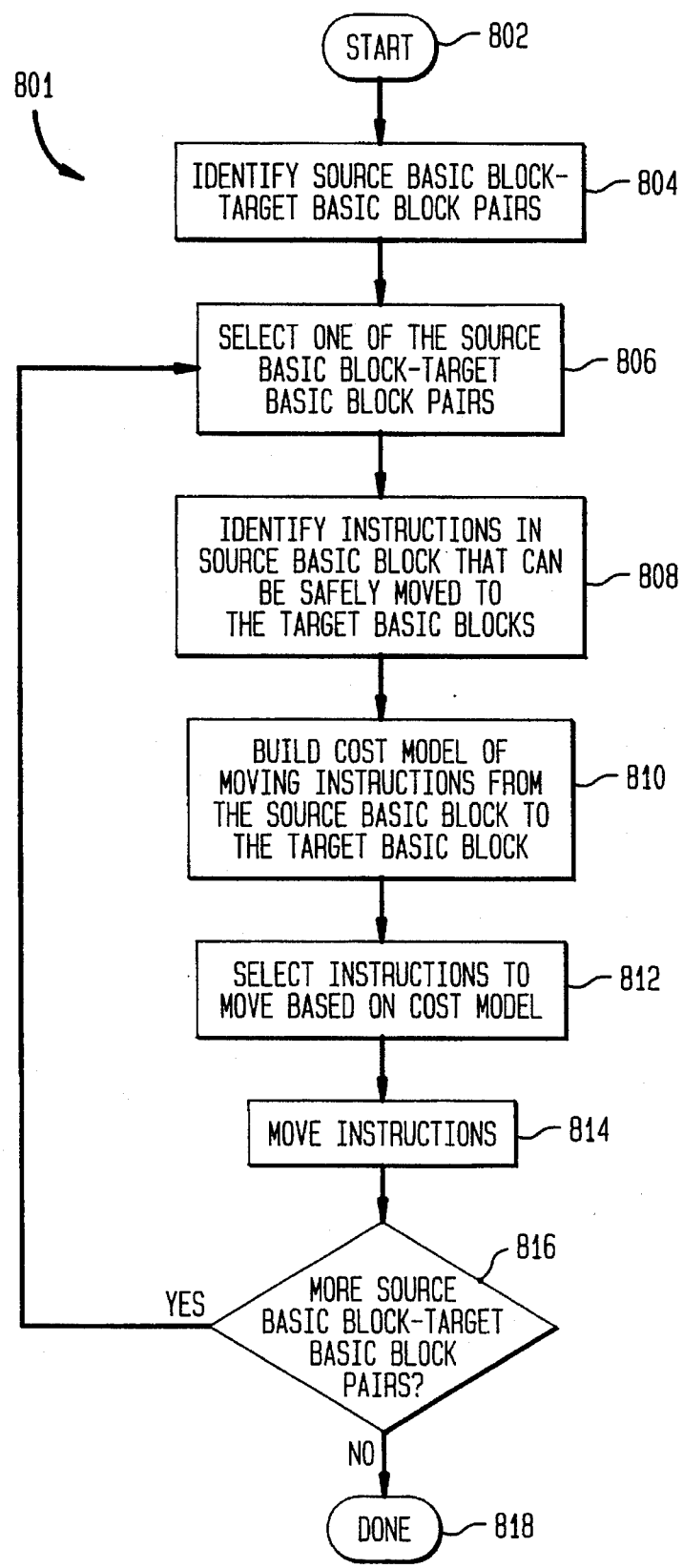
FIG. 8 is a flow chart depicting the overall operation of a software compiler system according to a preferred embodiment of the present invention.

In step 1306, the compiler 128 calculates the critical path length for the target basic block of the basic block pair selected in step 806 (FIG. 8). The compiler 128 performs step 1306 by calculating the path length of each of the data dependency graphs in the target basic block (as will be appreciated, the target basic block may include a plurality of independent data dependency graphs). The compiler 128 then assigns the maximum of these path lengths as the critical path length of the target basic block.

Figures 14A, 14B:
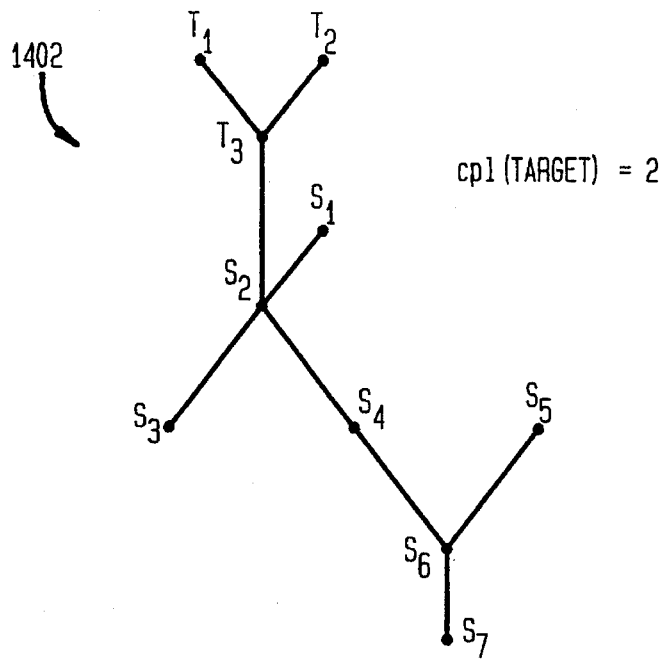
FIG. 14A illustrates an example data dependency graph for use in describing the flow chart of FIG. 13.
FIG. 14B illustrates a table containing information pertaining to the data dependency graph of FIG. 14A.

Consider, for example, a data dependency graph 1402 shown in FIG. 14A. Assume that this data dependency graph 1402 is from the combined source BB/target BB data dependency graph of the basic block pair selected in step 806, wherein nodes T1, T2, and T3 are from the target basic block. Also assume that the latency of each of the nodes in the data dependency graph 1402 is one cycle.

Under these conditions, the path length of that part of the data dependency graph 1402 attributable to the target basic block is two cycles (one cycle due to node T1 or T2 plus one cycle due to node T3). If this path length is the greatest or maximal of the path lengths of all of the target basic block data dependency graphs, then this path length is assigned as the critical path length (cpl) of the target basic block. For purposes of the examples provided above, assume that the critical path length of the target basic block is two cycles.

In step 1308, the compiler 128 calculates the earliest start (estart) and the latest start (lstart) of each of the nodes in all of the data dependency graphs of the combined source BB/target BB data dependency graph. For illustrative purposes, the estart and lstart of each of the nodes of the data dependency graph 1402 of FIG. 14A are shown in a table 1404 in FIG. 14B (where the latency of each node is assumed to be one cycle).

In step 1310, the compiler 128 identifies any fixed nodes in the combined source BB/target BB graph. As used herein, a fixed node is a node which, for non-data dependency reasons, cannot be moved from one basic block to another. For example, an instruction is a fixed node if movement of the instruction between basic blocks could cause an exception. For example, a divide instruction is a fixed node since it should not be moved from a block which tests for a "divide by 0" condition (also called a floating point overflow).

The compiler 128 in step 1310 assigns a high cost of movement value to each node which it identified as being a fixed node. By assigning high cost of movement values to fixed nodes, the compiler 128 ensures that fixed nodes are not moved between basic blocks (this is described further below). For example, assume that node S7 in the graph 1402 of FIG. 14A is identified as being a fixed node. As shown in table 1404 of FIG. 14B, the compiler 128 has assigned a high cost of movement value to node S7.

In step 1312, the compiler 128 classifies the non-fixed nodes in the source basic block (actually, the portion of the source basic block that comprises instructions that are safe to move) as being profitable to move, not profitable to move, or no impact resulting from move (also called "don't care").

A node is profitable to move if Equation 1 is satisfied:

$$\text{lstart(node)} < \text{cpl(target basic block)} \qquad \text{(Eq. 1)}$$

A node is not profitable to move if Equation 2 is satisfied:

$$\text{estart(node)} \geq \text{cpl(target basic block)} \qquad \text{(Eq. 2)}$$

Movement of a node has no impact (and, thus, the node as classified as "don't care") if Equation 3 is satisfied:

$$\text{lstart(node)} \geq \text{cpl(target basic block) and estart(node)} < \text{cpl(target basic block)} \qquad \text{(Eq. 3)}$$

The classifications of nodes S1–S7 in the graph 1402 of FIG. 14A (wherein nodes S1–S7 are attributable to the source basic block) according to Equations 1–3 are shown in table 1404 of FIG. 14B.

In step 1314, the compiler 128 calculates a cost of movement for each of the non-fixed nodes in the source basic block (actually, the portion of the source basic block that comprises instructions that are safe to move). Equation 4 is used to calculate the cost of movement for nodes which are classified as profitable to move:

$$\text{cost=cpl(target basic block)}-\text{lstart(node)} \qquad \text{(Eq. 4)}$$

Equation 5 is used to calculate the cost of movement for nodes which are classified as not profitable to move:

$$\text{cost=estart(node)+latency(node)} -\text{cpl(target basic block)} \qquad \text{(Eq. 5)}$$

Nodes which are classified as "don't care" are assigned a cost of movement value of zero.

The cost of movement values of nodes S1–S7 in the graph 1402 of FIG. 14A according to Equations 4 and 5 (and the fact that "don't care" nodes are assigned a cost of movement value of zero) are shown in table 1404 of FIG. 14B. These cost of movement values are also included in the data dependency graph 1402 of FIG. 14A. This data dependency graph 1402 with the cost of movement values indicated thereon represents the critical path length cost of movement model for the basic block pair selected in step 806 (although only that part of this cost of movement model relating to the data dependency graph 1402 of FIG. 14A is shown).

3.3.2 Generating the Register Pressure Cost of Movement Model

When selecting which instructions from the source basic block to move to the target basic block, the compiler 128 takes into consideration the number of registers which are required to communicate data between the source and target basic blocks (as will be appreciated, data available during the processing of the target basic block which are required for the processing of the source basic block must be stored in registers upon the completion of the processing of the target basic block). By properly selecting the instructions which are moved from the source basic block (actually, the portion of the source basic block that comprises instructions that are safe to move) to the target basic block, the number of registers needed to transfer data between the source and target basic blocks can be reduced. This is called register pressure.

Figure 15:
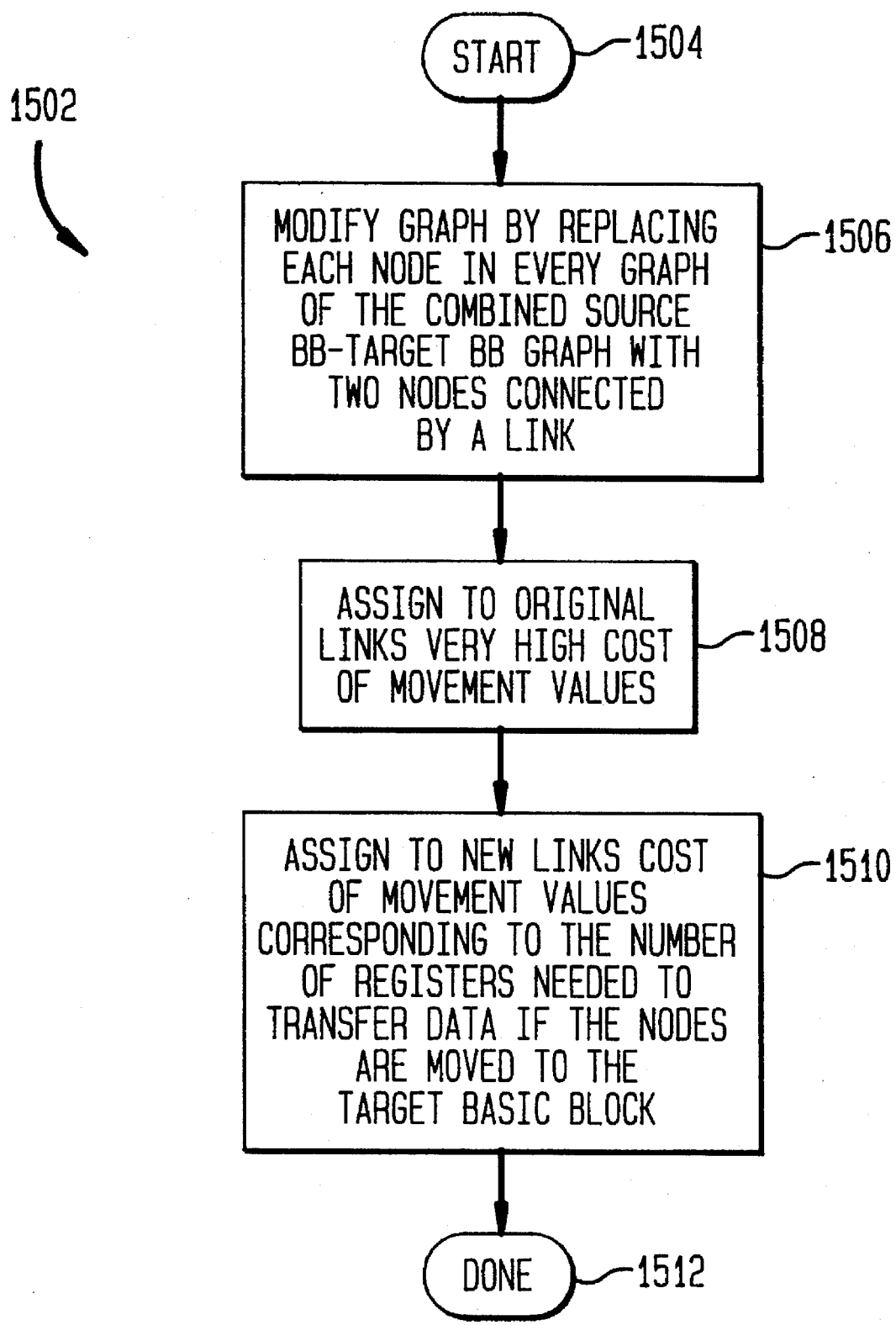
FIG. 15 is a flow chart depicting the manner in which the present invention generates a register pressure cost model.

The manner in which the compiler 128 generates a cost of movement model based on register pressure (step 1106 in FIG. 11) shall now be described in detail with reference to FIG. 15, which illustrates a flowchart 1502 depicting the operation of the present invention. Operation of the flowchart 1502 begins with step 1504, where control immediately passes to step 1506.

In step 1506, the compiler 128 modifies the combined source BB/target BB graph by replacing each node in the combined source BB/target BB graph with two nodes connected by a link (such links are called "new" links, as opposed to the "original" links that exists in the combined source BB/target BB graph prior to modification). One of the two nodes represents the original node, and the other node represents a "dummy" node that does not perform a function.

Figure 16A:
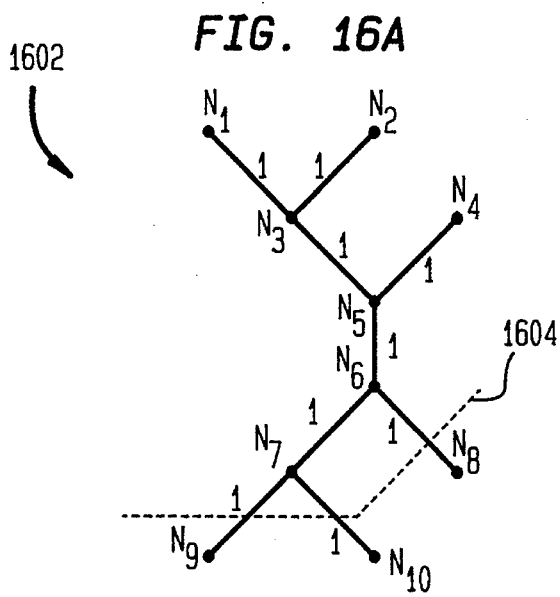
FIG. 16A illustrates an example data dependency graph for use in describing the flow chart of FIG. 15.

Consider, for example, a dam dependency graph 1602 shown in FIG. 16A. Assume that the graph 1602 is from the combined source BB/target BB data dependency graph, and that the numbers positioned along the links of the graph 1602 represent the number of registers needed to transfer data from the preceding node to the succeeding node (these are called "original" register requirement values, since they exists in the combined source BB/target BB graph prior to modification).

Figure 16B:
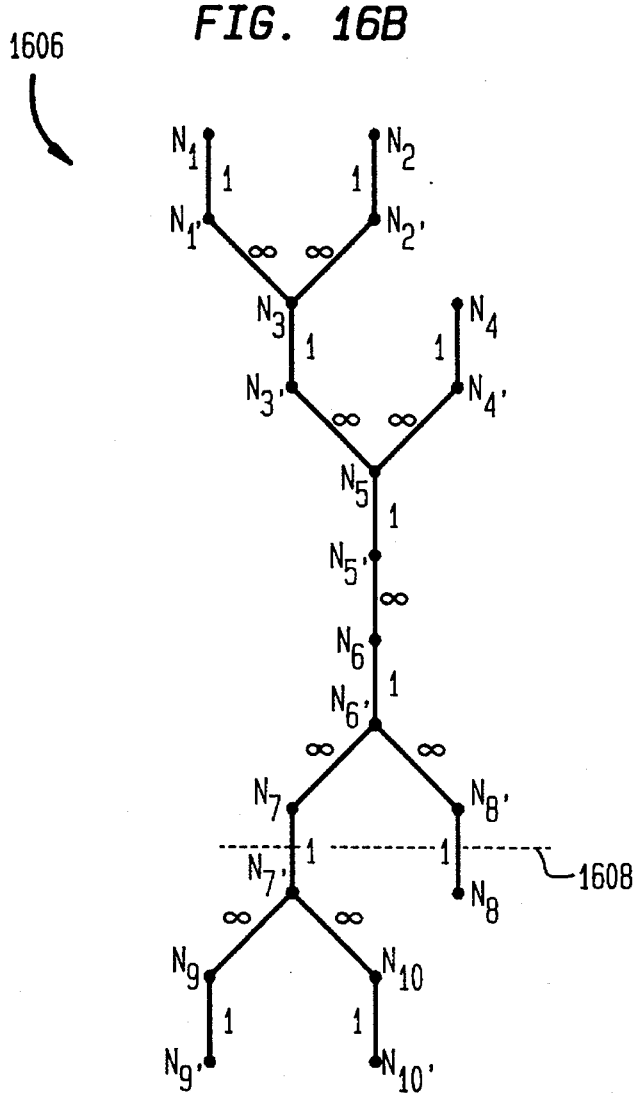
FIG. 16B illustrates the example data dependency graph of FIG. 16A after each node of the data dependency graph has been replaced with two nodes connected by a link.

FIG. 16B presents a data dependency graph 1606 representing the graph 1602 of FIG. 16A after the performance of step 1506. In graph 1606, node N1 has been replaced by nodes N1 and N1', node N2 has been replaced by nodes N2 and N2', etc.

In step 1508, the compiler 128 assigns very high register requirement values to the original links in the modified, combined source BB/target BB graph. For example, in the data dependency graph 1606 of FIG. 16B, the original links contained therein have been assigned register requirement values equal to infinity. The actual values assigned to the original links are implementation dependent. Any value is acceptable as long as it is much larger than the original register requirement values.

The compiler 128 also assigns very high register requirement values to non-movable instructions in the source basic block (whether fixed or non-movable due to data dependency reasons), and to nodes of the target basic block which are not adjacent to nodes of the source basic block (that is, to nodes of the target basic block which are not directly connected to nodes of the source basic block).

In step 1510, the compiler 128 sets the new links in the modified, combined source BB/target BB graph equal to the original register requirement values associated with the respective original links (assuming that these new nodes have not already been set to high register requirement values in step 1508). For example, in the graph 1606 of FIG. 16B, the new link between nodes N1 and N1' has been set equal to one, which represents the original register requirement value associated with node N1 (or, equivalently, which represents the original register requirement value associated with the original link between nodes N1 and N3).

After the completion of step 1510, the modified, combined source BB/target BB graph represents the register pressure cost of movement model.

As discussed above, during the generation of the register pressure cost of movement model the compiler 128 replaced each node of the combined source BB/target BB graph with two nodes connected by a link (step 1506). Such operation is necessary to avoid possible inaccuracies in the register requirements indicated by the unmodified combined source BB/target BB graph.

In FIG. 16A, for example, if nodes N1–N7 are moved to the target basic block, as indicated by cut line 1604, then graph 1602 would indicate that three registers would be required to transfer data between the source and target basic blocks. This would not be correct, however, since nodes N9 and N10 receive the same data from node N7 and, therefore, only two registers are actually required (one register to store the data from node N7, and one register to store the data from node N8).

This problem, however, is not present in the data dependency graph 1608 of Figure 16B, wherein the cut line 1608 is equivalent to the cut line 1604 in FIG. 16A. The data dependency graph 1606 correctly indicates that two registers are required if nodes N1–N7 are moved to the target basic block.

3.3.3 Generating the Latency Subsumption Cost of Movement Model

Figure 18A:
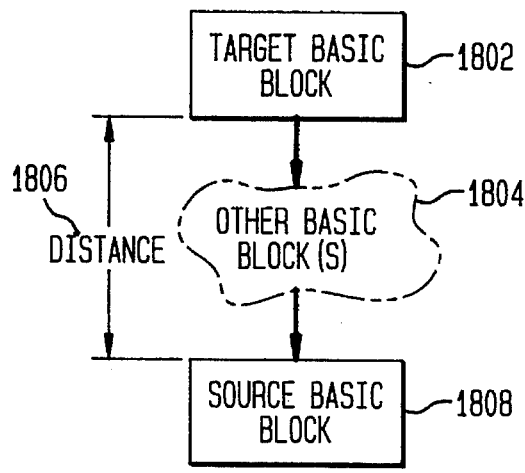
FIG. 18A illustrates an example target basic block/source basic block pair for use in describing the flow chart of FIG. 17.

Referring to FIG. 18A, when selecting which instructions to move from the source basic block 1808 (actually, the portion of the source basic block 1808 that comprises instructions that are safe to move) to the target basic block 1802, the compiler 128 takes into consideration the existence of one or more basic blocks 1804 which may be processed between the processing of the target basic block 1802 and the source basic block 1808. In particular, the compiler 128 attempts to move from the source basic block 1808 to the target basic block 1802 instructions which may execute in parallel with the execution of such other basic blocks 1804. This is called latency subsumption.

The manner in which the compiler 128 generates a cost of movement model based on latency subsumption (step 1108 in FIG. 11) shall now be described in detail with reference to FIG. 17, which illustrates a flowchart 1702 depicting the operation of the present invention. Operation of the flowchart 1702 begins with step 1704, where control immediately passes to step 1706.

In step 1706, the compiler 128 determines the distance (indicated as 1806 in the example of FIG. 18A) between the target basic block and the source basic block of the basic block pair selected in step 806 (FIG. 8). This distance is defined herein as the number of cycles which transpire between the end of processing of the target basic block and the start of processing of the source basic block.

This distance is preferably equal to the combined critical path lengths of the basic blocks (indicated as 1804 in the example of FIG. 18A) between the target basic block and the source basic block and can be identified by profiling, for example. If the target basic block is directly adjacent to the source basic block, then the distance is equal to zero.

In step 1708, the compiler 128 determines the maximum latency (called "maxl") of the source basic block (actually, the portion of the source basic block that comprises instructions that are safe to move). The maximum latency is equal to the maximum latency among all of the instructions in the portion of the source basic block that comprises instructions that are safe to move.

Figure 18B:
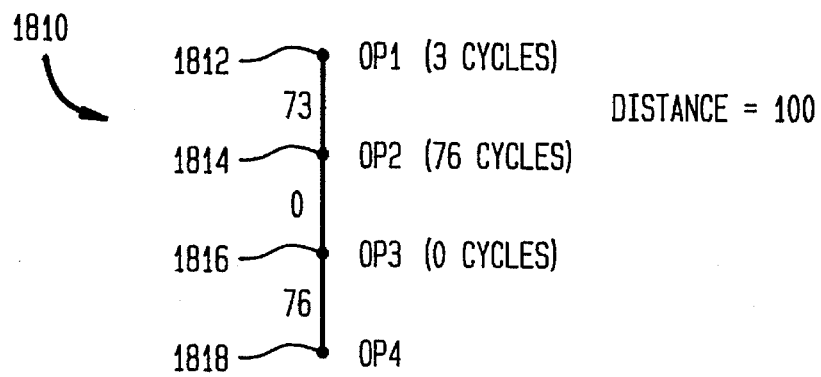
FIG. 18B illustrates an example data dependency graph having a distance of 100 between the target and source basic blocks for use in describing the flow chart of FIG. 17.

Consider FIG. 18B, which depicts a data dependency graph 1810 comprising nodes 1812, 1814, and 1816. Assume that the graph 1810 is from the portion of the source basic block that comprises instructions that are safe to move. Node 1812 is associated with an operation OP1 having a latency of three cycles. Node 1814 is associated with an operation OP2 having a latency of 76 cycles. Node 1816 is associated with an operation OP3 having a latency of zero cycles. Thus, the maximum latency is 76 cycles.

In step 1710, the compiler 128 determines the cost of moving the nodes of the source basic block (actually, the portion of the source basic block that comprises instructions that are safe to move) to the target basic block based on latency subsumption. Preferably, the compiler 128 determines such cost of movement values according to Equation 6:

$$\text{cost}=\max(0,(\min(\text{maxl},\text{distance})-\text{latency}(\text{node}))) \qquad \text{(Eq. 6)}$$

Where the distance of the basic blocks between the target basic block and the source basic block is equal to 100, as shown in FIG. 18B, the cost of moving node 1812 is:

$$\text{cost}=\max(0,(\min(76,100)-3))=73$$

Figure 18C:
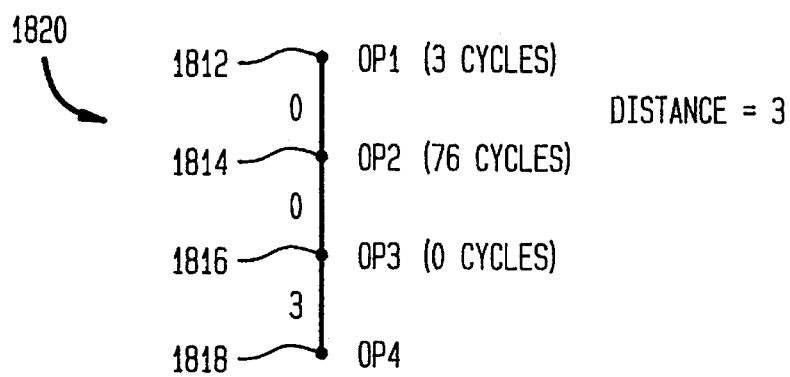
FIG. 18C illustrates an example data dependency graph, having a distance of 3 between the target and source basic blocks, for use in describing the flow chart of FIG. 17.

Similarly, the cost of moving node 1814 is 0, and the cost of moving node 1816 is 76. These cost of movement values are indicated in the dam dependency graph 1810, which represents the latency subsumption cost of movement model for the scenario presented in FIG. 18B.

Where the distance of the basic blocks between the target basic block and the source basic block is equal to three, the cost of moving nodes 1812, 1814, and 1816 is 0, 0, and 3, respectively, as shown in FIG. 18C (which represents the latency subsumption cost of movement model for the scenario presented in FIG. 18C).

3.3.4 Generating the Overall Cost of Movement Model

As discussed above, in step 1110 of FIG. 11 the compiler 128 combines the critical path length, register pressure, and latency subsumption cost of movement models to form an overall cost of movement model. The manner in which the compiler 128 generates this overall cost of movement model shall now be described in detail with reference to FIG. 19, which illustrates a flowchart 1902 depicting the operation of the present invention. The flowchart 1902 begins with step 1904, where control passes immediately to step 1906.

In step 1906, the compiler 128 normalizes the critical path length, the register pressure, and the latency subsumption cost of movement models. The compiler 128 performs step 1906 by replacing every node in the critical path length and the latency subsumption cost of movement models with two nodes connected by a link, as discussed above for the register pressure cost of movement model (see FIG. 15).

Figure 20A:
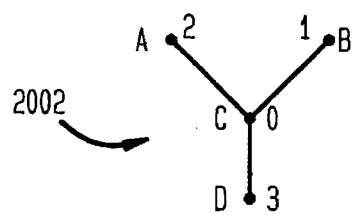
FIG. 20A illustrates an example critical path cost of movement model for use in describing the flow chart of FIG. 19.
Figure 20B:
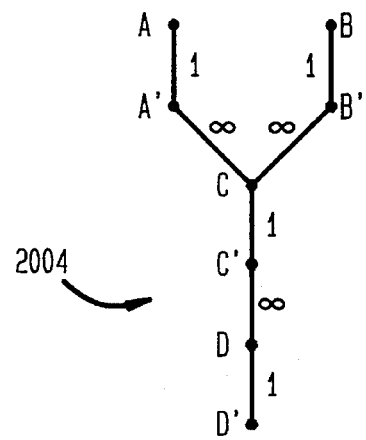
FIG. 20B illustrates an example register pressure cost of movement model for use in describing the flow chart of FIG. 19.
Figure 20C:
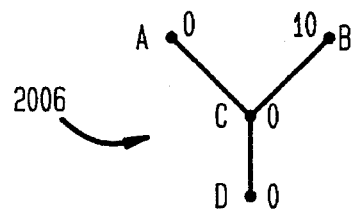
FIG. 20C illustrates an example latency cost of movement model for use in describing the flow chart of FIG. 19.
Figure 20D:
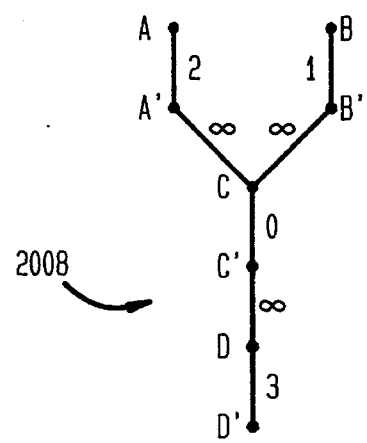
FIG. 20D illustrates an example equivalent critical path cost of movement model for use in describing the flow chart of FIG. 19.
Figure 20E:
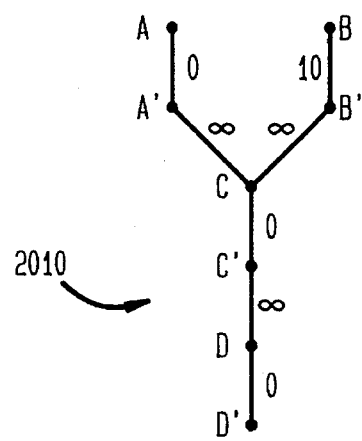
FIG. 20E illustrates an example equivalent latency cost of movement model for use in describing the flow chart of FIG. 19.

This is shown, for example, in FIGS. 20A–20E, where FIGS. 20A and 20C illustrate a critical path length cost of movement model 2002 and a latency subsumption cost of movement model 2006, respectively, before operation of step 1906, and FIGS. 20D and 20E illustrate an equivalent critical path length cost of movement model 2008 and an equivalent latency subsumption cost of movement model 2010, respectively, after operation of step 1906. FIG. 20B illustrates a register pressure cost of movement model 2004.

In step 1908, the compiler 128 applies appropriate weights to the cost of movement values in the normalized cost of movement models 2008, 2004, and 2010. Such weights are implementation dependent and are necessary to properly reflect the varying impacts the different factors (that is, critical path length, register pressure, and latency subsumption) have on the profitability of moving instructions from the source basic block to the target basic block.

For example, register pressure would be assigned a high weight in regions of the computer program which have high register requirements. Alternatively, register pressure would be assigned a low weight in regions of the computer program which have low register requirements. Generally, the weight assigned to critical path length should be the same as the weight assigned to latency subsumption since they are both derived from node latency.

Referring to FIG. 20B, for example, if the weight assigned to register pressure is two, then during step 1908 the compiler 128 would multiply by two each of the cost of movement values in the register pressure model 2004, such that the cost of movement value on the link between nodes A and A' is two, the cost of movement value on the link between nodes C and C' is two, etc.

Figure 20F:
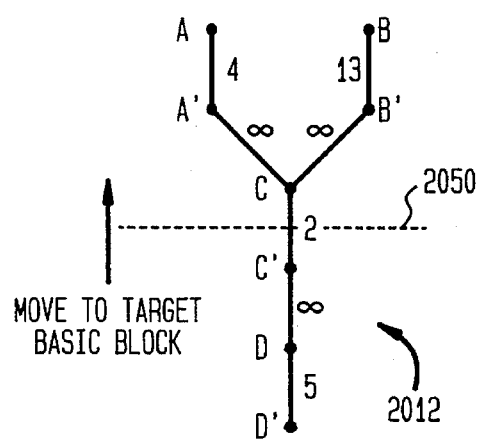
FIG. 20F illustrates an overall cost of movement model for use in describing the flow chart of FIG. 19.

In step 1910, the compiler 128 combines the weighted cost of movement values to produce an overall cost of movement model. This is shown in FIG. 20F, which illustrates an overall cost of movement model 20F for the weighted cost models shown in FIGS. 20D, 20B, and 20E. In the example of FIG. 20F, the weight for critical path length and latency subsumption is assumed to be one, and the weight for register pressure is assumed to be two, such that the cost of movement value in the overall model 2012 for the link between nodes B and B' is equal to 13 (1+2+10).

Referring again to FIG. 8, in step 812 the compiler 128 selects instructions of the maximal set to move from the source basic block to the target basic block based on the overall cost of movement model generated during step 810. Preferably, during step 812 the compiler 128 "cuts" the overall cost of movement model along the link(s) having the lowest cost of movement values, and then selects the nodes above the cut line (that is, adjacent to the target basic block). Preferably, the compiler 128 performs this cutting function using a minimum cut procedure. Minimum cut procedures are well known and are described in many publicly available documents, such as Ford, L. R. and Fulkerson, D. R., *Flows in Networks*, Princeton Univ. Press, Princeton, N.J. (1962), which is herein incorporated by reference in its entirety.

With regard to the overall cost of movement model 2012 shown in FIG. 20F, for example, the lowest cost of movement is along the link between nodes C and C'. Thus, the compiler 128 would select for movement nodes A, B, and C.

In step 814, the compiler 128 moves from the source basic block to the target basic block the nodes identified in step 814.

In step 816, the compiler 128 determines whether there are any more pairs of basic blocks to process. If they are more to process, then the compiler 128 loops back to step 806. Otherwise, the aggregate instruction movement function performed by the compiler 128 is complete, as indicated by oval 818.

A pair of basic blocks might be processed more than once because subsequent movements can change any of them to the extent that they would have to be reprocessed. When selecting basic block pairs to process, the pairs at the end of the flowgraph are preferred, so that the chances of them being changed by subsequent movements are reduced.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of generating object code from an intermediate representation of source code, the object code adapted for execution on a target computer having an instruction set, the intermediate representation comprising a plurality of basic blocks each being represented by a plurality data dependency graphs, each data dependency graph comprising a plurality of nodes each corresponding to an instruction from the target computer instruction set, the method comprising the steps of:

(1) selecting a source basic block being one of the basic blocks of the intermediate representation and a target basic block being another of the basic blocks of the intermediate representation;

(2) identifying a maximal set of instructions contained in said source basic block that are movable from said source basic block to said target basic block without violating any data dependency relationships of the data dependency graphs;

(3) generating an overall cost model of aggregately moving instructions of said maximal set from said source basic block to said target basic block, said cost model specifying an executable cost of moving each of said instructions of said maximal set from said source basic block to said target basic block; and (4) aggregately moving one or more instructions of said maximal set from said source basic block to said target basic block according to said cost model to form the object code.

2. The method of claim 1, wherein step (3) comprises the step of generating a combined source and target basic block by concatenating data dependency graphs contained in the target basic block with data dependency graphs corresponding to said maximal set of instructions contained in the source basic block.

3. The method of claim 2, wherein step (3) further comprises the steps of:

(a) calculating a critical path length of the target basic block;

(b) calculating in accordance with said target basic block critical path length earliest start values and latest start values for nodes of data dependency graphs contained in said combined source and target basic block;

(c) classifying, in accordance with said target basic block critical path length, said earliest start values, and said latest start values, each node of said combined source and target basic block as being one of a "profitable" node that is profitable to move to the target basic block, a "not profitable" node that is not profitable to move to the target basic block, and a "no impact" node which would have no impact if moved to the target basic block; and (d) generating, in accordance with said node classifications, said target basic block critical path length, said earliest start values, and said latest start values, a critical path length cost model of aggregately moving instructions of said maximal set from said source basic block to said target basic block, said critical path length cost model representing at least a portion of said overall cost model.

4. The method of claim 3, wherein step (c) comprises the steps of:

classifying a node of said combined source and target basic block as being a "profitable" node if said target basic block critical path length is greater than the latest start value of the node;

classifying a node of said combined source and target basic block as being a "not profitable" node if the earliest start value of the node is greater than or equal to said target basic block critical path length; and classifying a node of said combined source and target basic block as being a "no impact" node if said target basic block critical path length is less than or equal to the latest start value of the node, and if the earliest start value of the node is less than said target basic block critical path length.

5. The method of claim 3, wherein step (d) comprises the steps of:

generating a cost of movement value for a node classified as a "profitable" node by subtracting the latest start value of the node classified as a "profitable" node from said target basic block critical path length;

generating a cost of movement value for a node classified as a "not profitable" node by subtracting said target basic block critical path length from a sum of the earliest start value and a latency value of the node classified as a "not profitable" node;

setting a cost of movement value equal to a predetermined value for each node classified as a "no impact" node; and associating said cost of movement values with respective nodes in said combined source and target basic block to thereby generate said critical path length cost model.

6. The method of claim 2 in which each node of the combined source and target basic block is assigned a register requirement value that specifies a number of registers needed to transfer data between basic blocks, wherein step (3) comprises the steps of:

replacing each node in said combined source and target basic block with a pair of nodes connected to one another by a new link to thereby generate a modified combined source and target basic block;

assigning to each new link a register requirement value associated with a node of said combined source and target basic block replaced by said pair of nodes connected to one another by said each new link; and assigning to all other links in said modified combined source and target basic block a predetermined register requirement value, said modified combined source and target basic block representing at least a portion of said overall cost model.

7. The method of claim 1, wherein step (1) comprises the steps of:

(a) classifying a first basic block and a second basic block of the intermediate representation as being a circular basic block pair if said first basic block always executes after one of said second basic block and another basic block of the intermediate representation via a control loop that couples said first basic block to said another basic block;

(b) classifying said first and second basic blocks as being an equivalent basic block pair if said first basic block always executes after said second basic block;

(c) classifying said first and second basic blocks as being a code duplication basic block pair if said first basic block is always processed after one of said second basic block and another basic block of the intermediate representation;

(d) classifying said first and second basic blocks as being a speculative basic block pair if said first basic block is sometimes processed after said second basic block; and (e) assigning basic blocks from one of a circular basic block pair, an equivalent basic block pair, a code duplication basic block pair, and a speculative basic block pair of the intermediate representation as said source and target basic blocks.

8. The method of claim 7, wherein step (e) comprises the steps of:

assigning basic blocks from a circular basic block pair as said source and target basic blocks if a circular basic block pair exists in the intermediate representation;

assigning basic blocks from an equivalent basic block pair as said source and target basic blocks if a circular basic block pair does not exist and an equivalent basic block pair exists in the intermediate representation;

assigning basic blocks from a code duplication basic block pair as said source and target basic blocks if circular and equivalent basic block pairs do not exist and a code duplication basic block pair exists in the intermediate representation; and assigning basic blocks from a speculative basic block pair as said source and target basic blocks if circular, equivalent, and code duplication basic block pairs do not exist and a speculative basic block pair exists in the intermediate representation.

9. The method of claim 1, wherein step (3) comprises the steps of:

(a) calculating a distance value representing the number of cycles which transpire between processing of the target basic block and processing of the source basic block;

(b) determining a latency value of each node in the source basic block;

(c) identifying a node in the source basic block having a latency value greater than all other nodes in the source basic block;

(d) calculating cost of movement values for nodes of the source basic block according to a relationship:

$$\text{cost}=\max(0,(\min(\text{maxl},\text{distance})-\text{latency}(\text{node})))$$

wherein "max" represents a maximum operation, "min" represents a minimum operation, maxl represents a latency value of the node identified in step (c), and "distance" represents said distance value; and (e) associating said cost of movement values with respective nodes in said combined source and target basic block to thereby generate at least a portion of said overall cost model.

10. A system for generating object code from an intermediate representation of source code, the object code adapted for execution on a target computer having an instruction set, the intermediate representation comprising a plurality of basic blocks each being represented by a plurality data dependency graphs, each data dependency graph comprising a plurality of nodes each corresponding to an instruction from the target computer instruction set, the system comprising:

means for selecting a source basic block being one of the basic blocks of the intermediate representation and a target basic block being another of the basic blocks of the intermediate representation;

means for identifying a maximal set of instructions contained in said source basic block that are movable from said source basic block to said target basic block without violating any data dependency relationships of the dam dependency graphs;

means for maintaining in a storage device a target description table having an entry for each instruction of the target computer instruction set, each entry comprising a scheduling information portion and an operand pattern portion, a union of said scheduling information and operand pattern portions specifying when operands and results of an instruction are accessed;

overall cost model generating means for referring to said target description table to generate an overall cost model of aggregately moving instructions of said maximal set from said source basic block to said target basic block, said cost model specifying an executable cost of moving each of said instructions of said maximal set from said source basic block to said target basic block; and means for aggregately moving one or more instructions of said maximal set from said source basic block to said target basic block according to said cost model to form the object code.

11. The system of claim 10, wherein said overall cost model generating means comprises means for generating a combined source and target basic block by concatenating data dependency graphs contained in the target basic block with data dependency graphs corresponding to said maximal set of instructions contained in the source basic block.

12. The system of claim 11, wherein said overall cost model generating means further comprises:

means for calculating a critical path length of the target basic block;

means for calculating in accordance with said target basic block critical path length earliest start values and latest start values for nodes of data dependency graphs contained in said combined source and target basic block;

node classifying means for classifying, in accordance with said target basic block critical path length, said earliest start values, and said latest start values, each node of said combined source and target basic block as being one of a "profitable" node that is profitable to move to the target basic block, a "not profitable" node that is not profitable to move to the target basic block, and a "no impact" node which would have no impact if moved to the target basic block; and critical path length cost model generating means for generating, in accordance with said node classifications, said target basic block critical path length, said earliest start values, and said latest start values, a critical path length cost model of aggregately moving instructions of said maximal set from said source basic block to said target basic block, said critical path length cost model representing at least a portion of said overall cost model.

13. The system of claim 12, wherein said node classifying means comprises:

means for classifying a node of said combined source and target basic block as being a "profitable" node if said target basic block critical path length is greater than the latest start value of the node;

means for classifying a node of said combined source and target basic block as being a "not profitable" node if the earliest start value of the node is greater than or equal to said target basic block critical path length; and means for classifying a node of said combined source and target basic block as being a "no impact" node if said target basic block critical path length is less than or equal to the latest start value of the node, and if the earliest start value of the node is less than said target basic block critical path length.

14. The system of claim 12, wherein said critical path length cost model generating means comprises:

means for generating a cost of movement value for a node classified as a "profitable" node by subtracting the latest start value of the node classified as a "profitable" node from said target basic block critical path length;

means for generating a cost of movement value for a node classified as a "not profitable" node by subtracting said target basic block critical path length from a sum of the earliest start value and a latency value of the node classified as a "not profitable" node;

means for setting a cost of movement value equal to a predetermined value for each node classified as a "no impact" node; and means for associating said cost of movement values with respective nodes in said combined source and target basic block to thereby generate said critical path length cost model.

15. The system of claim 11 in which each node of the combined source and target basic block is assigned a register requirement value that specifies a number of registers needed to transfer data between basic blocks, wherein said overall cost model generating means further comprises:

means for replacing each node in said combined source and target basic block with a pair of nodes connected to one another by a new link to thereby generate a modified combined source and target basic block;

means for assigning to each new link a register requirement value associated with a node of said combined source and target basic block replaced by said pair of nodes connected to one another by said each new link; and means for assigning to all other links in said modified combined source and target basic block a predetermined register requirement value, said modified combined source and target basic block representing at least a portion of said overall cost model.

16. The system of claim 10, wherein said overall cost model generating means comprises:

means for calculating a distance value representing the number of cycles which transpire between processing of the target basic block and processing of the source basic block;

means for determining a latency value of each node in the source basic block;

node identifying means for identifying a node in the source basic block having a latency value greater than all other nodes in the source basic block;

means for calculating cost of movement values for nodes of the source basic block according to a relationship:

$$cost=\max(0,(\min(maxl,distance)-latency(node)))$$

wherein "max" represents a maximum operation, "min" represents a minimum operation, maxl represents a latency value of the node identified by said node identifying means, and "distance" represents said distance value; and means for associating said cost of movement values with respective nodes in said combined source and target basic block to thereby generate at least a portion of said overall cost model.

* * * * *